United States Patent
Cai

(10) Patent No.: US 8,638,652 B2
(45) Date of Patent: Jan. 28, 2014

(54) SIGNAL TRANSMISSION WITH FIXED SUBCARRIER SPACING WITHIN OFDMA COMMUNICATION SYSTEMS

(75) Inventor: Sean Cai, San Diego, CA (US)

(73) Assignee: ZTE (USA) Inc., San Diego, CA (US)

(*) Notice: Subject to any disclaimer, the term of this patent is extended or adjusted under 35 U.S.C. 154(b) by 266 days.

(21) Appl. No.: 12/790,692

(22) Filed: May 28, 2010

(65) Prior Publication Data

US 2011/0032850 A1    Feb. 10, 2011

Related U.S. Application Data

(60) Provisional application No. 61/182,658, filed on May 29, 2009, provisional application No. 61/185,170, filed on Jun. 8, 2009.

(51) Int. Cl.
*H04J 11/00* (2006.01)
*H04B 7/204* (2006.01)
*H04B 7/208* (2006.01)

(52) U.S. Cl.
USPC ............ 370/203; 370/319; 370/344; 370/480

(58) Field of Classification Search
USPC ......... 370/203–210, 310–350, 464, 468–469, 370/477–480
See application file for complete search history.

(56) References Cited

U.S. PATENT DOCUMENTS

| | | | | |
|---|---|---|---|---|
| 7,613,104 B2 * | 11/2009 | Bhatt et al. | | 370/208 |
| 8,204,025 B2 * | 6/2012 | Cai et al. | | 370/337 |
| 8,295,373 B2 * | 10/2012 | Yin et al. | | 375/260 |
| 8,369,301 B2 * | 2/2013 | Cai | | 370/344 |
| 8,406,335 B2 * | 3/2013 | Park et al. | | 375/267 |
| 8,477,799 B2 * | 7/2013 | Hwang et al. | | 370/437 |
| 2009/0122771 A1 * | 5/2009 | Cai | | 370/338 |
| 2009/0185632 A1 * | 7/2009 | Cai et al. | | 375/260 |
| 2010/0149961 A1 * | 6/2010 | Lee et al. | | 370/204 |
| 2010/0220674 A1 * | 9/2010 | Fu | | 370/329 |
| 2010/0265851 A1 * | 10/2010 | Shahar | | 370/278 |
| 2013/0114509 A1 * | 5/2013 | Cai | | 370/328 |

* cited by examiner

*Primary Examiner* — Tri H Phan
(74) *Attorney, Agent, or Firm* — Duane Morris LLP

(57) ABSTRACT

A station is disclosed that is configured for signal transmission in an Orthogonal Frequency Division Multiple Access (OFDMA) system. The station includes a processor configured to fix a subcarrier spacing to a predetermined value for one or more subframes in all available bandwidths. The station further includes a transmitter configured to transmit a signal having the fixed subcarrier spacing, regardless of a frame structure of the one or more subframes. According to certain embodiments, the predetermined value may be divided evenly by at least one channel raster. The predetermined value may be 12.5 KHz, according to certain embodiments. Alternatively, the predetermined value is 6.25 KHz for one or more low mobility mobile stations, and/or the predetermined value is 25 KHz for one or more high mobility mobile stations. The station may be a mobile station or a base station configured for uplink and downlink transmission.

47 Claims, 21 Drawing Sheets

SIGNAL TRANSMISSION WITH FIXED SUBCARRIER SPACING WITHIN OFDMA COMMUNICATION SYSTEMS

CROSS-REFERENCE TO RELATED APPLICATIONS

This application claims priority to U.S. Provisional Patent Application No. 61/182,658 filed on May 29, 2009, entitled "Further Considerations on OFDMA Numerology", and U.S. Provisional Patent Application No. 61/185,170 filed on Jun. 8, 2009, entitled "Further Considerations on OFDMA Numerology," the contents of which are incorporated by reference herein in their entirety.

FIELD OF THE INVENTION

The present invention relates generally to numerology in wireless communication systems, and more particularly to signal transmission with fixed subcarrier spacing in Orthogonal Frequency Division Multiple Access (OFDMA) communication systems.

BACKGROUND

Two competing IMT-Advanced technologies are based on Long Term Evolution (LTE)-Advanced and IEEE 802.16m. 3GPP is developing an IMT-Advanced specification based on a newly completed LTE standard, which is to be adopted as the 4G standard. The air interface specification of Wireless Interoperability for Microwave Access (WiMAX) has been provided by the IEEE 802.16 standard, and the IEEE 802.16 Task Group m (TGm) is actively developing evolutionary specifications based on existing IEEE 802.16 and WiMAX profiles for IMT-Advanced submissions.

However, LTE and IEEE 802.16 have adopted different values of subcarrier spacing. LTE has fixed its subcarrier spacing to 15 KHz, but IEEE 802.16 has made its subcarrier spacing a variable for different sets of system bandwidths, namely 10.9375 KHz, 7.8125 KHz, 9.765625 KHz, etc. It is desired that the design of IEEE 802.16m enable it to be a cost-effective, global and competitive technology well into the future. Meeting these needs will require some balance between how IEEE 802.16m will be constrained by the requirement to support legacy mobile stations while continuing to meet the needs of a global IMT-Advanced technology.

IEEE 802.16m SRD requires that IEEE 802.16m shall meet the IMT-Advanced requirements. And all enhancements included as part of IEEE 802.16m should promote the concept of continued evolution, allowing IEEE 802.16 to maintain competitive performance as technology advances beyond 802.16m. On the other hand, the IEEE 802.16m standard requires that IEEE 802.16m shall provide continuing support and interoperability for a Wireless MAN-OFDMA Reference System which is defined as being system compliant with the capabilities set specified by the WiMAX Forum Mobile System Profile Release 1.0. For example, based on the backward compatibility requirements, 802.16m base stations shall support 802.16m and legacy mobile stations when both are operating on the same RF carrier.

However, there are problems existing in current legacy system designs. Some of them have an unfavorable impact of system implementation, network deployment and equipment cost. Thus, it is desirable to prevent the inheritance of the legacy systems' drawbacks as the 802.16m system is designed.

SUMMARY OF THE INVENTION

The presently disclosed embodiments are directed to solving one or more of the problems presented in the prior art, described above, as well as providing additional features that will become readily apparent by reference to the following detailed description when taken in conjunction with the accompanying drawings.

In the following description, embodiments of the invention are disclosed that provide that in order for 802.16m (referred to herein as "16m") to be a cost-effective, competitive, global technology, it should adopt a different approach to OFDMA configuration in which the subcarrier spacing is fixed to a value that properly serves the radio environments in which 16m is intended to operate and which is highly compatible with available and potential future carrier bandwidths. To this end, according to various embodiments, the physical layer of IEEE 802.16m is proposed to be based on a fixed subcarrier spacing of 12.5 kHz, for example; the rationale for this approach and the selection of this particular spacing and the issues with retaining the current OFDMA parameters are described in detail in the remainder of this document. It is also suggested that TDD LTE-Advanced can adopt the same subcarrier spacing, so that the two systems can work side-by-side in adjacent channels without cross-channel interference. With the same subcarrier spacing of 12.5 KHz, for example, both LTE-Advanced and IEEE 802.16m can share the same sampling frequency, and the same piece of hardware can support both LTE-Advanced and IEEE 802.16m in all available bandwidths in all frequency bands in the world.

One embodiment of the present invention is directed to a method for signal transmission in an Orthogonal Frequency Division Multiple Access (OFDMA) system. According to certain embodiments, the method may include fixing a subcarrier spacing to a predetermined value for one or more subframes in all available bandwidths; and transmitting a signal having the fixed subcarrier spacing, regardless of a frame structure of the one or more subframes.

Another embodiment is directed to a station is disclosed that is configured for signal transmission in an OFDMA system. The station includes a processor configured to fix a subcarrier spacing to a predetermined value for one or more subframes in all available bandwidths. The station further includes a transmitter configured to transmit a signal having the fixed subcarrier spacing, regardless of a frame structure of the one or more subframes. The station may be a mobile station or a base station configured for uplink and downlink transmission.

Yet another embodiment is directed to a computer-readable medium storing executable instructions thereon for performing method for signal transmission in an OFDMA system. The method may include fixing a subcarrier spacing to a predetermined value for one or more subframes in all available bandwidths; and transmitting a signal having the fixed subcarrier spacing, regardless of a frame structure of the one or more subframes.

According to certain embodiments, the predetermined value may be divided evenly by at least one channel raster. The common value for the channel raster can include 100 kHz, 200 kHz and/or 250 kHz, for example.

The predetermined value may be 12.5 KHz, according to certain embodiments. Alternatively, the predetermined value is 6.25 KHz for one or more low mobility mobile stations, and/or the predetermined value is 25 KHz for one or more high mobility mobile stations. By adopting the proposed solutions described herein, the IEEE 8016m design become much cleaner and simpler with noticeably improved performance. The problems and challenges described above, among others that will become apparent, can be resolved by the proposed solutions described herein.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
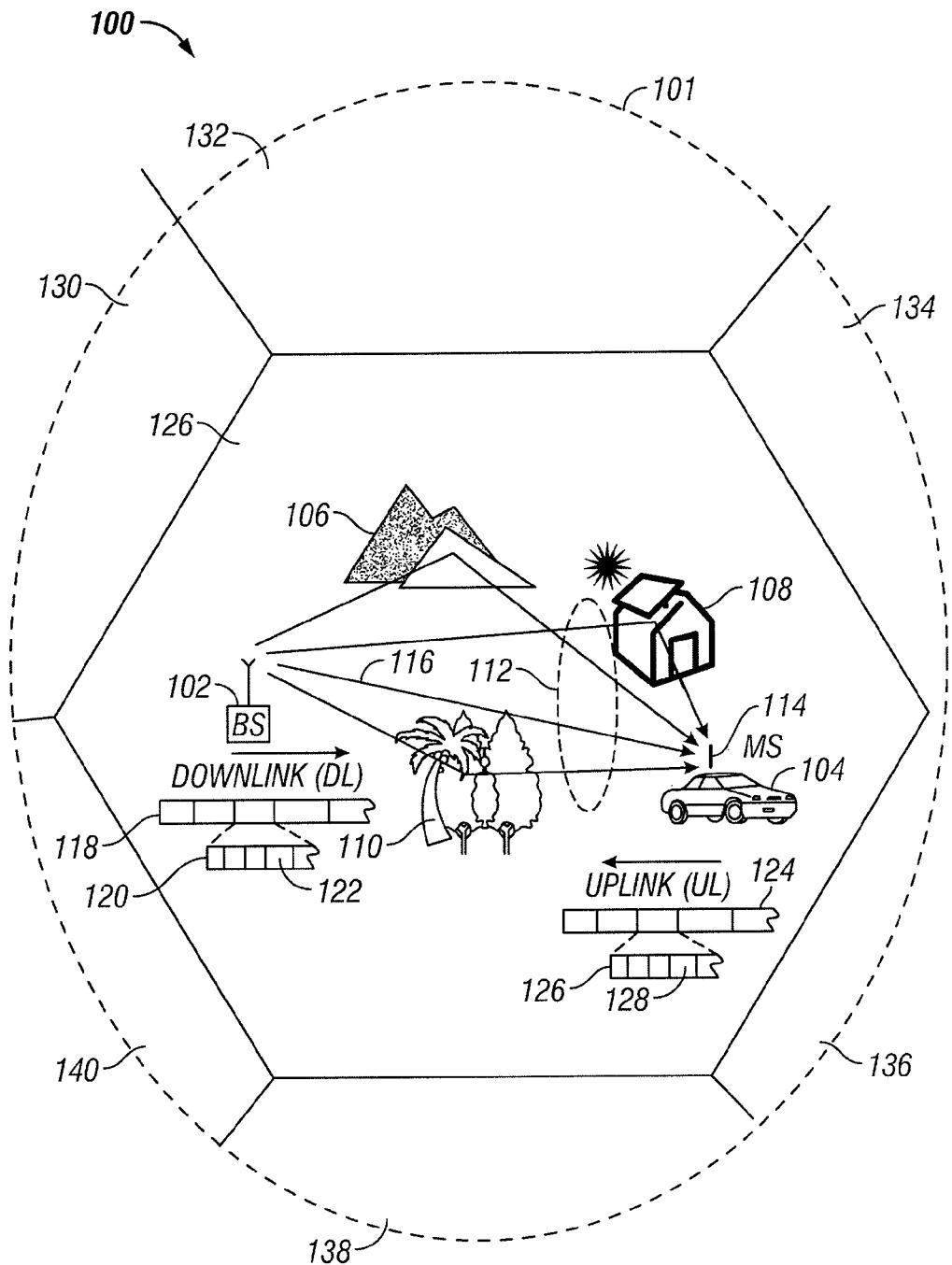
FIG. 1 is an illustration of an exemplary OFDM/OFDMA mobile radio channel operating environment, according to an embodiment.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein describe a wireless cellular communication system where the transmission direction from a base station to mobile station is called downlink, while the opposite direction is called uplink. On both downlink and uplink, the radio signal transmissions over the time are divided into periodic frames (or subframes, slots, etc). Each radio frame contains multiple time symbols that include data symbols (DS) and reference symbols (RS). Data symbols carry the data information, while the reference symbols are known at both transmitter and receiver, and are used for channel estimation purposes. Note that the functions described in the present disclosure may be performed by either a base station or a mobile station. A mobile station may be any user device such as a mobile phone, and a mobile station may also be referred to as user equipment (UE).

Aspects of the present disclosure are directed toward systems and methods for OFDM/OFDMA frame structure technology for communication systems. Embodiments of the invention are described herein in the context of one practical application, namely, communication between a base station and a plurality of mobile devices. In this context, the exemplary system is applicable to provide data communications between a base station and a plurality of mobile devices. Embodiments of the disclosure, however, are not limited to such base station and mobile device communication applications, and the methods described herein may also be utilized in other applications such as mobile-to-mobile communications, or wireless local loop communications. As would be apparent to one of ordinary skill in the art after reading this description, these are merely examples and the invention is not limited to operating in accordance with these examples. Assignment of resources within a frame to the data being carried can be applied to any digital communications system with data transmissions organized within a frame structure and where the full set of such resources within a frame can be flexibly divided according to portions of different sizes to the data being carried. Thus, the present disclosure is not limited to any particular type of communication system; however, embodiments of the present invention are described herein with respect to exemplary OFDM/OFDMA systems.

As explained in additional detail below, the OFDM/OFDMA frame structure comprises a variable length subframe structure with an efficiently sized cyclic prefix operable to effectively utilize OFDM/OFDMA bandwidth. The frame structure provides compatibility with multiple wireless communication systems.

FIG. 1 illustrates a mobile radio channel operating environment 100, according to one embodiment of the present invention. The mobile radio channel operating environment 100 may include a base station (BS) 102, a mobile station (MS) 104, various obstacles 106/108/110, and a cluster of notional hexagonal cells 126/130/132/134/136/138/140 overlaying a geographical area 101. Each cell 126/130/132/134/136/138/140 may include a base station operating at its allocated bandwidth to provide adequate radio coverage to its intended users. For example, the base station 102 may operate at an allocated channel transmission bandwidth to provide adequate coverage to the mobile station 104. The exemplary mobile station 104 in FIG. 1 is an automobile; however mobile station 104 may be any user device such as a mobile phone. Alternately, mobile station 104 may be a personal digital assistant (PDA) such as a Blackberry device, MP3 player or other similar portable device. According to some embodiments, mobile station 104 may be a personal wireless computer such as a wireless notebook computer, a wireless palmtop computer, or other mobile computer devices.

The base station 102 and the mobile station 104 may communicate via a downlink radio frame 118, and an uplink radio frame 124 respectively. Each radio frame 118/124 may be further divided into sub-frames 120/126 which may include data symbols 122/124. In this mobile radio channel operating environment 100, a signal transmitted from a base station 102 may suffer from the operating conditions mentioned above. For example, multipath signal components 112 may occur as a consequence of reflections, scattering, and diffraction of the transmitted signal by natural and/or man-made objects 106/108/110. At the receiver antenna 114, a multitude of signals may arrive from many different directions with different delays, attenuations, and phases. Generally, the time difference between the arrival moment of the first received multipath component 116 (typically the line of sight component), and the last received multipath component (possibly any of the multipath signal components 112) is called delay spread. The combination of signals with various delays, attenuations, and phases may create distortions such as ISI and ICI in the received signal. The distortion may complicate reception and conversion of the received signal into useful information. For example, delay spread may cause ISI in the useful information (data symbols) contained in the radio frame 124.

OFDM can mitigate delay spread and many other difficult operating conditions. OFDM divides an allocated radio communication channel into a number of orthogonal subchannels of equal bandwidth. Each subchannel is modulated by a unique group of subcarrier signals, whose frequencies are equally and minimally spaced for optimal bandwidth efficiency. The group of subcarrier signals are chosen to be orthogonal, meaning the inner product of any two of the subcarriers equals zero. In this manner, the entire bandwidth allocated to the system is divided into orthogonal subcarriers. OFDMA is a multi-user version of OFDM. For a communication device such as the base station 102, multiple access is accomplished by assigning subsets of orthogonal sub-carriers to individual subscriber devices. A subscriber device may be a mobile station 104 with which the base station 102 is communicating.

Figure 2:
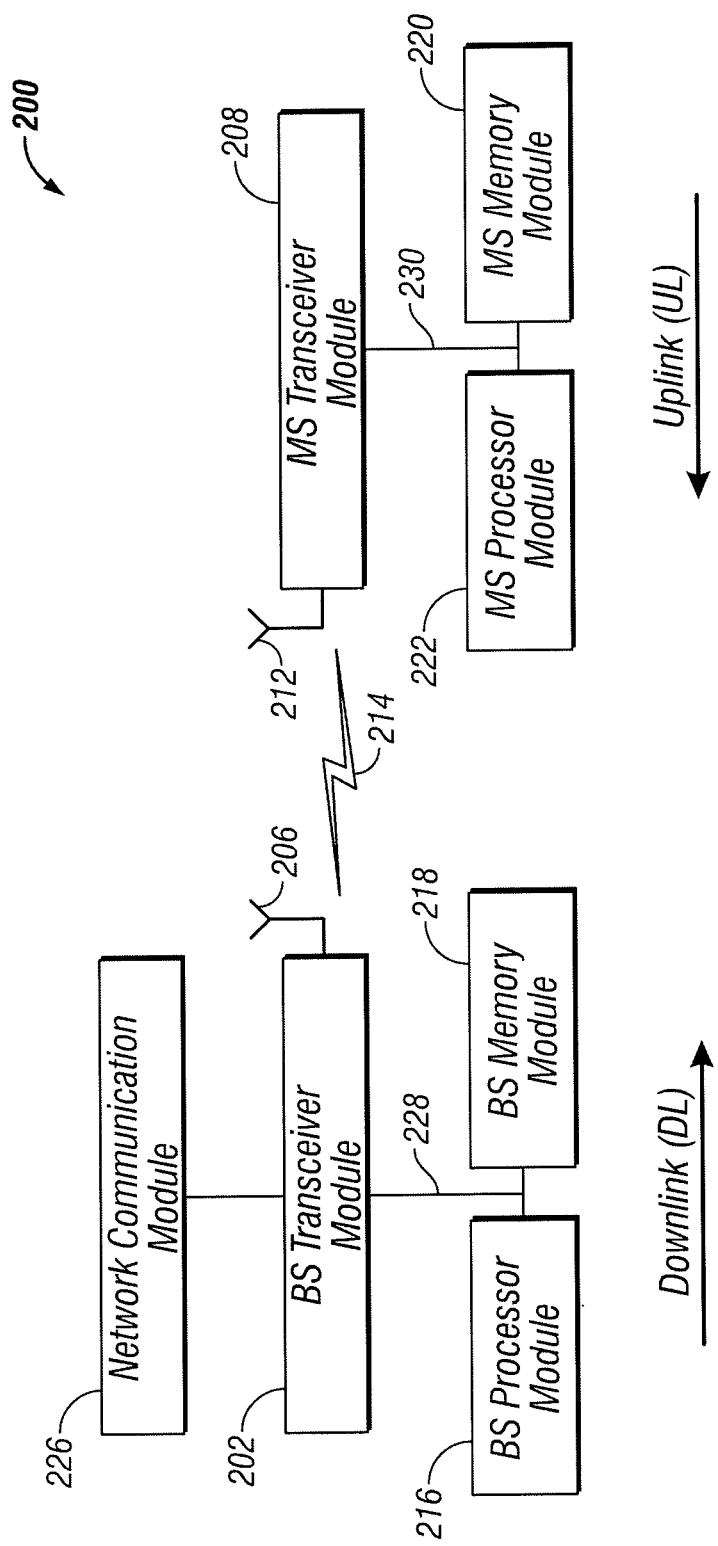
FIG. 2 is an illustration of an exemplary OFDM/OFDMA exemplary communication system according to an embodiment.

FIG. 2 shows an exemplary wireless communication system 200 for transmitting and receiving OFDM/OFDMA transmissions, in accordance with one embodiment of the present invention. The system 200 may include components and elements configured to support known or conventional operating features that need not be described in detail herein. In the exemplary embodiment, system 200 can be used to transmit and receive OFDM/OFDMA data symbols in a wireless communication environment such as the wireless communication environment 100 (FIG. 1). System 200 generally comprises a base station 102 with a base station transceiver module 202, a base station antenna 206, a base station processor module 216 and a base station memory module 218. System 200 generally comprises a mobile station 104 with a mobile station transceiver module 208, a mobile station antenna 212, a mobile station memory module 220, a mobile station processor module 222, and a network communication module 226. Of course both BS 102 and MS 104 may include additional or alternative modules without departing from the scope of the present invention.

Furthermore, these and other elements of system 200 may be interconnected together using a data communication bus (e.g., 228, 230), or any suitable interconnection arrangement. Such interconnection facilitates communication between the various elements of wireless system 200. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary OFDM/OFDMA system 200, the base station transceiver 202 and the mobile station transceiver 208 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular example of the OFDM/OFDMA system depicted in FIG. 2, an "uplink" transceiver 208 includes an OFDM/OFDMA transmitter that shares an antenna with an uplink receiver. A duplex switch may alternatively couple the uplink transmitter or receiver to the uplink antenna in time duplex fashion. Similarly, a "downlink" transceiver 202 includes an OFDM/OFDMA receiver which shares a downlink antenna with a downlink transmitter. A downlink duplex switch may alternatively couple the downlink transmitter or receiver to the downlink antenna in time duplex fashion.

Although many OFDM/OFDMA systems will use OFDM/OFDMA technology in both directions, those skilled in the art will recognize that the present embodiments of the invention are applicable to systems using OFDM/OFDMA technology in only one direction, with an alternative transmission technology (or even radio silence) in the opposite direction. Furthermore, it should be understood by a person of ordinary skill in the art that the OFDM/OFDMA transceiver modules 202/208 may utilize other communication techniques such as, without limitation, a frequency division duplex (FDD) communication technique.

The mobile station transceiver 208 and the base station transceiver 202 are configured to communicate via a wireless data communication link 214. The mobile station transceiver 208 and the base station transceiver 202 cooperate with a suitably configured RF antenna arrangement 206/212 that can support a particular wireless communication protocol and modulation scheme. In the exemplary embodiment, the mobile station transceiver 208 and the base station transceiver 202 are configured to support industry standards such as the Third Generation Partnership Project Long Term Evolution (3GPP LTE), Third Generation Partnership Project 2 Ultra Mobile Broadband (3 Gpp2 UMB), Time Division-Synchronous Code Division Multiple Access (TD-SCDMA), and Wireless Interoperability for Microwave Access (WiMAX), and the like. The mobile station transceiver 208 and the base station transceiver 202 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link, and could implement the role of radio resource controller or allocator, as described herein.

Processor modules 216/222 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 216/222 comprise processing logic that is configured to carry out the functions, techniques, and processing tasks associated with the operation of OFDM/OFDMA system 200. In particular, the processing logic is configured to support the OFDM/OFDMA frame structure parameters described herein. In practical embodiments the processing logic may be resident in the base station and/or may be part of a network architecture that communicates with the base station transceiver 202.

The steps of a method or algorithm described in connection with the embodiments disclosed herein may be embodied directly in hardware, in firmware, in a software module executed by processor modules 216/222, or in any practical combination thereof. A software module may reside in memory modules 218/220, which may be realized as RAM memory, flash memory, ROM memory, EPROM memory, EEPROM memory, registers, a hard disk, a removable disk, a CD-ROM, or any other form of storage medium known in the art. In this regard, memory modules 218/220 may be coupled to the processor modules 218/222 respectively such that the processors modules 216/220 can read information from, and write information to, memory modules 618/620. As an example, processor module 216, and memory modules 218, processor module 222, and memory module 220 may reside in their respective ASICs. The memory modules 218/220 may also be integrated into the processor modules 216/220. In an embodiment, the memory module 218/220 may include a cache memory for storing temporary variables or other intermediate information during execution of instructions to be executed by processor modules 216/222. Memory modules 218/220 may also include non-volatile memory for storing instructions to be executed by the processor modules 216/220.

Memory modules 218/220 may include a frame structure database (not shown) in accordance with an exemplary embodiment of the invention. Frame structure parameter databases may be configured to store, maintain, and provide data as needed to support the functionality of system 200 in the manner described below. Moreover, a frame structure database may be a local database coupled to the processors 216/222, or may be a remote database, for example, a central network database, and the like A frame structure database may be configured to maintain, without limitation, frame structure parameters as explained below. In this manner, a frame structure database may include a lookup table for purposes of storing frame structure parameters.

The network communication module 226 generally represents the hardware, software, firmware, processing logic, and/or other components of system 200 that enable bi-directional communication between base station transceiver 202, and network components to which the base station transceiver 202 is connected. For example, network communication module 226 may be configured to support internet or WiMAX traffic. In a typical deployment, without limitation, network communication module 226 provides an 802.3 Ethernet interface such that base station transceiver 202 can communicate with a conventional Ethernet based computer network. In this manner, the network communication module 226 may include a physical interface for connection to the computer network (e.g., Mobile Switching Center (MSC)).

In accordance with embodiments described herein, time-frequency allocation units are referred to as Resource Blocks (RBs). A Resource Block (RB) is defined as a fixed-size rectangular area within a subframe comprised of a specified number of subcarriers (frequencies) and a specified number of OFDMA symbols (time slots). An RB is the smallest fundamental time-frequency unit that may be allocated to an 802.16m user.

Figure 3:
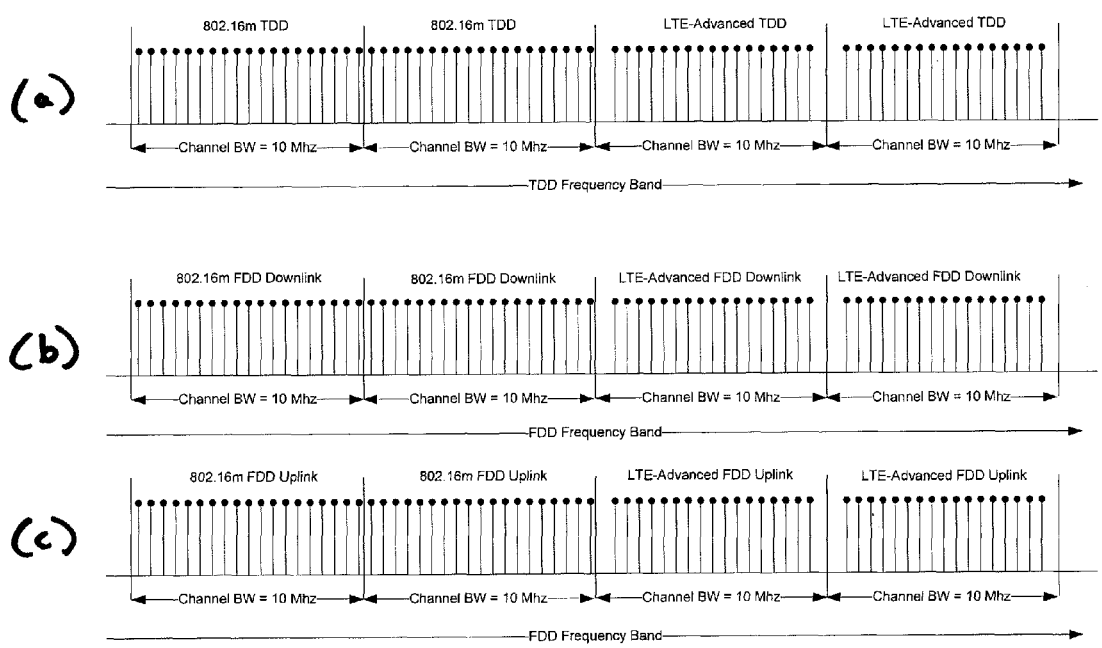
FIGS. 3(a)-3(c) show examples of common subcarrier spacing of 12.5 kHz in TDD and FDD bands, according to an embodiment.

FIGS. 3(a)-3(c) show examples of common subcarrier spacing of 12.5 kHz in TDD and FDD bands, according to an embodiment. Table 1 below provides a summary comparing how the new 12.5-kHz subcarrier spacing compares with the various options of retaining the current subcarrier spacing(s) in meeting key design considerations for 802.16m.

TABLE 1

| Key Design Considerations | Design Approach for 16m & LTE-Advanced Subcarrier Spacing | | |
|---|---|---|---|
| | New 12.5 kHz | Retain Current 16e & LTE Subcarrier Spacings | |
| | | Multiple Spacings 'As Is' (16e) | 15 kHz (LTE) |
| Greenfield (Legacy-free) Considerations | | | |
| Lower Hardware Cost | ✓ | X | ✓ |
| Simplified Global Roaming | ✓ | X | ✓ |
| Maximize usable bandwidth within carrier adjacent multi-carrier scenarios | ✓[1] | X | X[2] |
| Enable efficient adjacent multicarrier operation with different bandwidths | ✓ | X | X[2] |
| Enable multicarrier overlay scenarios of different bandwidths | ✓ | X | X |
| Simplified adaptation to new carrier bandwidths (e.g. 6/12 MHz) | ✓ | X | ✓--[3] |
| Legacy Support Considerations | | | |
| Legacy support via TDM multiplexing between 16e and 16m, or between LTE and LTE-Advanced | ✓ | ✓ | ✓ |
| Legacy support via FDM multiplexing between 16e and 16m | ✓--[4] | ✓-[5] | N/A |
| 16e and 16m or LTE and LTE-Advanced sharing of same freq/time area | ✓--[6] | ✓-[7] | ✓[8] |
| Less hardware re-design | ✓-[9] | ✓-[10] | ✓-[10] |
| Inter-RAT Co-existence Considerations | | | |
| Ease of co-existence with other IMT-Advanced Technologies (e.g. LTE) with Frame Slot Time Alignment | ✓ | X[11] | X[11] |

NOTES
✓ indicates is able to satisfy
✓- indicates is able to satisfy but with some undesirable constraints
✓-- indicates is able to satisfy but not preferred due to significant drawbacks
X indicates is not feasible or not practical
[1]Alignment of subcarrier spacing between adjacent subcarriers allows full carrier bandwidth to be utilized if adjacent carriers are 16m . . . resulting in >8% improvement in available used bandwidth.
[2]This also results in additional loss due to guard bands required between edges of adjacent carriers since carrier bandwidths are not divisible evenly by the raster.
[3]There may be some efficiency loss since 15 kHz subcarrier spacing does not divide most of available carrier bandwidths within spectrum band/block. Channel RF filter may be used to reduce out-of-band emission. On the other hand, the proposed 12.5 kHz subcarrier can divide any carrier bandwidths in any spectrum band/block in the world, and no channel RF filter is required.
[4]This can be done with additional hardware for parallel FFTs for different subcarrier spacings, coordinated subcarrier assignment for 16m & 16e, and sufficient guard subcarriers between 16e and 16m used subcarriers. Also, same constraints as (5).
[5]This can be done but can constrain subcarrier arrangement options on 16m subcarriers for 16e distributed subcarrier permutations (e.g. PUSC). The resource blocks are differently defined in 16m and 16e, and FDM is practically unworkable.
[6]16e and 16m support via TDM multiplexing between 16e and 16m in the same RF channel.
[7]Maximizes resource sharing between 16e and 16m but 16m MSs need to operate in a combined 16e/16m mode (tight coupling to 16e). BS has to support both 16e and 16m at the same time. With new releases of 16e and 16m in the future, it makes it very challenging to design and support such BS.
[8]No such requirements, but it can be done via TDM multiplexing.
[9]Complexity of change depends heavily on current design.
[10]One skilled in the art would realize that there may be PHY and/or MAC design changes for 16m. The similar reason goes to LTE-Advanced. However LTE-Advanced may expect smaller changes in PHY/MAC.
[11]Zone and subframe boundaries based on current numerology do not line up well with LTE frame element timings. Major problem expected for TDD mode. Even in FDD, a tight RF channel filter is needed to reduce out-of-band emission. Adopting the same 12.5 kHz subcarrier spacing, No RF channel filters are needed for any two systems in different bandwidths for adjacent channel co-existence.

OFDMA numerology is the base of OFDM technology and directly affects the frame structure design, which is one of the basic elements of the Physical Layer. Various problems are caused by OFDMA numerology used by legacy system and their effect on current legacy system. The following table describes the basic OFDMA numerology defined by current legacy system:

TABLE 2

| | Nominal Channel Bandwidth (MHz) | | | | |
|---|---|---|---|---|---|
| | 5 | 7 | 8.75 | 10 | 20 |
| Over-sampling Factor | 28/25 | 8/7 | 8/7 | 28/25 | 28/25 |
| Sampling Frequency (MHz) | 5.6 | 8 | 10 | 11.2 | 22.4 |
| FFT Size | 512 | 1024 | 1024 | 1024 | 2048 |
| Sub-Carrier Spacing (kHz) | 10.9375 | 7.8125 | 9.765625 | 10.9375 | 10.9375 |
| Tu (us) | 91.4 | 128 | 102.4 | 91.4 | 91.4 |

| Cyclic Prefix (CP) | Ts (us) | Number of OFDM Symbols per Frame | Idle Time (us) |
|---|---|---|---|
| $T_g = \frac{1}{8} T_u$ | 91.4 + 11.42 = 102.82 (for 5, 10, 20 MHz) | 48 (for 5, 10, 20 MHz) | 64.64 |
| | 128 + 16 = 144 (for 7 MHz) | 34 (for 7 MHz) | 104 |
| | 102.4 + 12.8 = 115.2 (for 8.75 MHz) | 43 (for 8.75 MHz) | 46.40 |

The legacy systems with 5/10/20 MHz, 3.5/7 MHz and 8.75 MHz have different subcarrier spacing values which are derived based on different series bandwidths, and therefore different sets of sampling frequencies. Such incompatible sampling frequency sets impose unnecessary complexity for equipment to support the various bandwidths. Based on the legacy support requirements, 802.16m BS 102 can support 802.16m and legacy MSs 104 when both are operating on the same RF carrier. However, there are three sets of legacy numerology in the 802.16 (or Mobile WiMAX) deployment, namely 5/10, 7/14, and 8.75. It is extremely crucial to support them all, to ensure global roaming compatibility with common equipment and devices. However, these legacy systems not only have different numerology parameters such as subcarrier spacing, they are often located in different frequency bands. These are significant challenges in the 16m design to support legacy systems.

The numerology based on a typical legacy 16e design can be found in Table 310a of IEEE 802.15e 2005, which is incorporated herein by reference. Out of 914 subcarriers that fall into the 10 MHz bandwidth, there are only 840 subcarriers that can be used to transmit information. Thus, 8.8% of the bandwidth is wasted. Furthermore, the bandwidth occupied by the 914 subcarriers does not fully fill the 10-Mhz carrier bandwidth. The following is the formula on how to calculate the maximum frequency efficiency:

$$n_{Efficiency} = \frac{R_{Modulation} \times n_{UsedSubcarriers}}{T_{symobol} \times BW_{System}} \quad (1)$$

where $R_{Modulation}$ is modulation rate (e.g. 4 for 16 QAM), $n_{UsedSubcarriers}$ is number of used subcarriers within the nominal system bandwidth, $T_{symobol}$ is symbol period, and $BW_{System}$ is the nominal system bandwidth.

According to an example, set CP=0 to calculate the maximum $n_{Efficiency}$ of the system:

$$T_{symobol} = \frac{1}{f_\Delta} \quad (2)$$

where $f_\Delta$ is subcarrier spacing.

$$BW_{System} \geq n_{MaximumSubcarriers} \times f_\Delta \quad (3)$$

where $n_{MaximumSubcarriers}$ is the maximum number of subcarriers that a nominal system bandwidth can have.

Substituting Eq. 2 and Eq. 3 into Eq. 1, results in the following:

$$n_{Efficiency} \leq \frac{R_{Modulation} \times n_{UsedSubcarriers}}{n_{MaximumSubcarriers}} \quad (4)$$

The frequency efficiency is proportional to the number of used subcarriers within the system bandwidth. For example, the 73 Guard Subcarriers ($n_{MaxiumumSubcarriers} - n_{UsedSubcarriers} = 914 - 841 = 73$) and 1 DC subcarrier can be used to transmit data, and divided by the maximum number of subcarriers of 914, the new 16m system can be immediately 8.8% more efficient. The proposed 16m numerology described herein allows all subcarriers to be used for data transmission without Guard Subcarriers since the subcarrier spacings between adjacent abutting carriers are aligned. This makes operation with the proposed 16m numerology to be 8.8%, according to this example, more efficient by design when compared to PUSC operation with the existing 16e numerology. When the operator bandwidth has sufficient guard band around a carrier, then the 8.8% need not be wasted.

Figure 4:
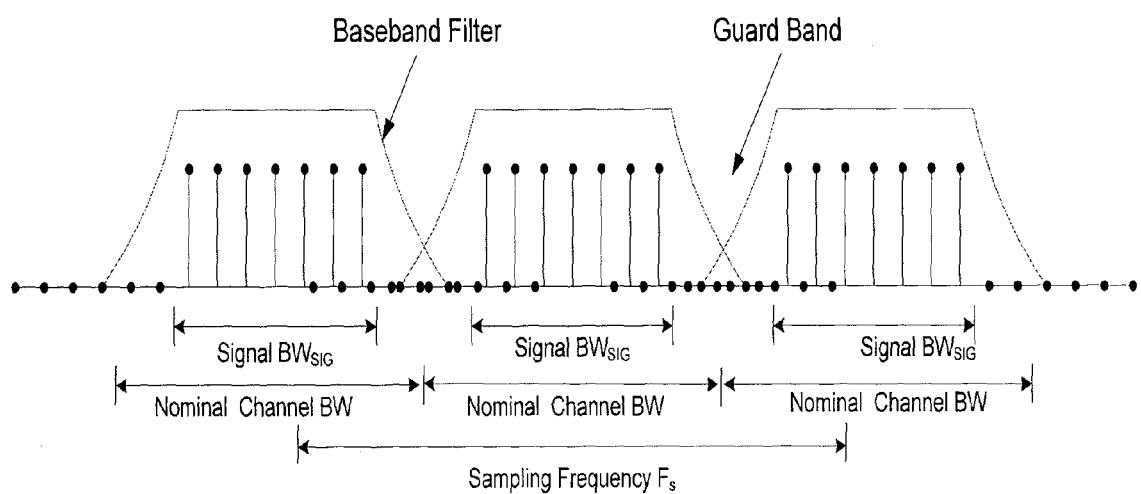
FIG. 4 is a diagram of carriers in a wireless communication system operated as adjacent carriers, according to an embodiment.
Figure 5:
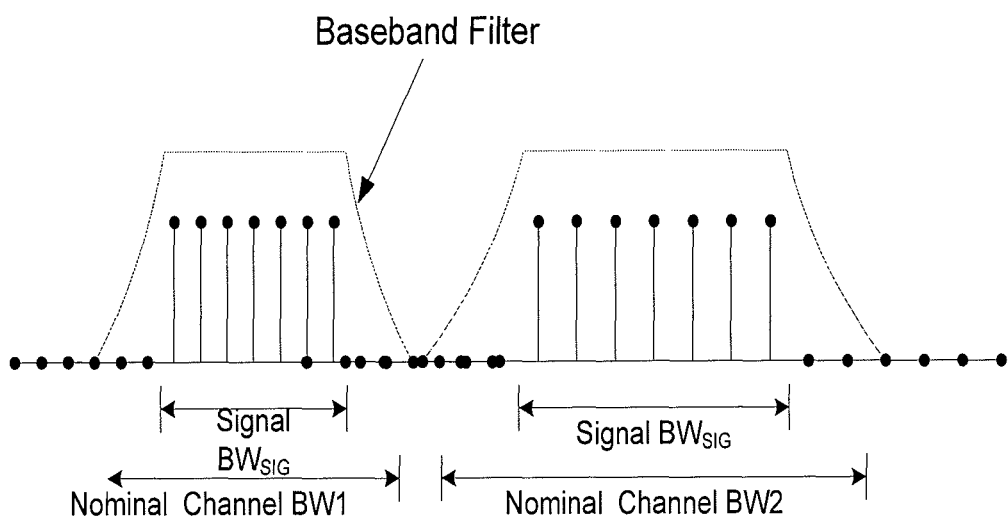
FIG. 5 is a diagram of carriers in a wireless communication system operated as adjacent carriers, according to an embodiment.

Service providers, for example often prefer a solution such as scalable deployment plan, launching more carriers as the business grows. The incompatible subcarrier spacing makes it unnecessarily restrict the efficiency and flexibility for 1.25 MHz series (5, 8.75, 10, 20 MHz) and 3.5 MHz series (3.5, 7, 14 MHz) to work in multi-carrier mode with the carriers being of the same or a mixture of different system bandwidths. If the carriers are operated as adjacent carriers as illustrated in FIGS. 4 and 5, inter-carrier interference due to the incompatible subcarrier spacings necessitates the presence of guard subcarriers. In addition, the multiple carriers cannot be operated as an overlay of several multiple bandwidths onto a common aggregate bandwidth (common FFT) in order to support devices of different bandwidth capabilities at the same time. This feature is important to be able to support devices with very different cost, complexity and throughput requirements on a common air interface (e.g. from low-rate, low-cost remote data collection/monitoring devices to high-end multimedia devices).

Figure 6:
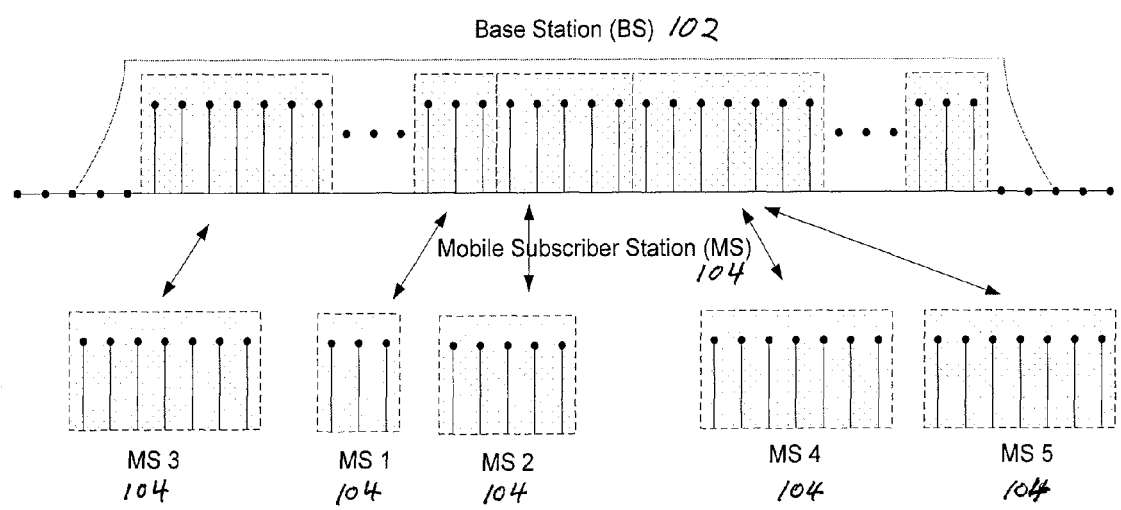
FIG. 6 shows an illustration of mixed bandwidths multi-carrier deployment without guard bands, according to an embodiment.

This multi-carrier mode is illustrated in FIG. 6. Using 12.5 kHz as the subcarrier spacing, 16m will line up with different rasters in different frequency bands and the subcarrier spacings between adjacent carriers will be aligned. Therefore, this subcarrier spacing will allow multi-carrier deployment with the same or mixed system bandwidths to be readily supported. This capability provides 16m a competitive advantage over UMB and LTE which cannot support multi-carrier deployment without guard subcarriers between neighboring carriers, as shown in FIG. 6. It demonstrates great advantages in multi-carrier deployment and an effective way to achieve global roaming for different 16m devices.

According to various embodiments, the downlink transmission scheme is based on conventional OFDM using a cyclic prefix, where the OFDM sub-carrier spacing is $\Delta f = 12.5$ kHz. In addition there may be also a reduced subcarrier spacing $\Delta f_{low} = 6.25$ kHz, for low mobility and Multicast Broadcast Services (MBS) dedicated cell(s), and an increased subcarrier spacing $\Delta f_{hi} = 25$ kHz, for higher mobility coverage such, to cover a bullet train, for example. Table 3 below provides proposed basic OFDM numerology, according to certain embodiments.

TABLE 3

| Parameter | Unit | Parameter Values |
|---|---|---|
| Sub-carrier Spacing ($\Delta f$) | KHz | 12.5 |
| Optional sub-carrier Spacing ($\Delta f_{low}$, $\Delta f_{hi}$) | KHz | 6.25, 25 |
| Sampling Frequency (Fs) | MHz | 25.6 |
| Sampling Period (Ts) | µs | 0.0390625 |
| Number of Ts for 10 ms | Ts | 256000 |
| FFT size | | 2048 |

According to certain embodiments, radio frames, according to the LTE standard, include a 10 ms duration. Two radio frame structures remain supported by LTE-Advanced:

Type 1—applicable to FDD; and
Type 2—applicable to TDD and H-FDD.

Figure 7A:
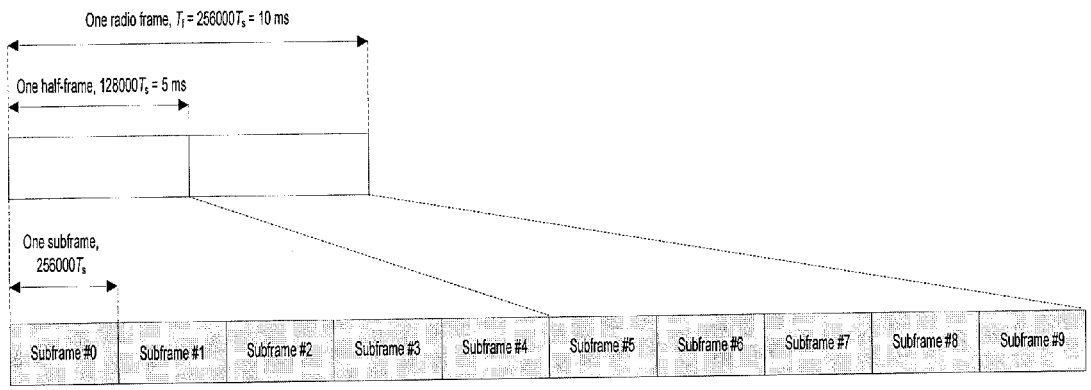
FIGS. 7(a) and 7(b) provide exemplary frame structures for Type 1 and Type 2 frame structures, respectively, according to an embodiment.

FIGS. 7(*a*) and (*b*) provide a frame structure of Type 1 and a frame structure of Type 2, respectively. There may be 10 subframes within a 10-ms radio frame, where each subframe is 1 ms long. The common subframe parameters are provided in Table 4 below.

TABLE 4

| Sub-carrier Spacing (Δf) | | KHz | 12.5 | 6.25 | 25 |
|---|---|---|---|---|---|
| Sub-frame duration | | ms | 1 | 1 | 1 |
| Number of Ts | | $T_s$ | 25600 | 25600 | 25600 |
| CP Length | Normal CP1 | $T_s$ | 85 | 170 | 195 |
| ($T_{CP}$) | Extended CP2 | $T_s$ | 512 | | 682 |
| Number of OFDM | | $N_{CP1}$ | 12 | 6 | 21 |
| Symbols Per Sub-frame | | $N_{CP2}$ | 10 | | 15 |
| Extra Samples | $n_{CP1}$ | $T_s$ | 4 | 4 | 1 |
| for Symbol#0 | $n_{CP2}$ | | 0 | | 10 |

In the case of 12.5 kHz sub-carrier spacing, for example there may be 2 cyclic-prefix (CP) lengths. These are CP choices for a 1-ms subframe, corresponding to 12 and 10 OFDM symbols per subframe respectively, according to the present embodiment.

Normal cyclic prefix 1: $T_{CP1}$=89×Ts (OFDM symbol #0)=3.4765625 μs, $T_{CP1}$=85×Ts (OFDM symbol #1 to #11)=3.3203125 μs Extended cyclic prefix 2: $T_{CP2}$=512×Ts (OFDM symbol #0 to #9)=20 μs, where $T_s$=1/(2048×Δf)

In case of 6.25 KHz sub-carrier spacing there may be only a single CP length.

Low Δf cyclic prefix 1: $T_{CP-low}$=174×Ts (OFDM symbol #0)=6.796875 μs, $T_{CP-low}$=170×Ts (OFDM symbol #1 to #5)=6.640625 μs In the case of 25 kHz sub-carrier spacing there may be 2 CP lengths. These are CP choices for a 1-ms subframe, corresponding to 21 and 15 OFDM symbols per subframe respectively.

High Δf cyclic prefix 1: =196×Ts (OFDM symbol #0)=7.65625 μs, $T_{CP-hi1}$=195×Ts (OFDM symbol #1 to #20)=7.61718745 μs High Δf cyclic prefix 2: $T_{CP-hi2}$=692×Ts (OFDM symbol #0 to #4)=27.03125 μs, $T_{CP-hi2}$=682×Ts (OFDM symbol #1 to #14)=26.640625 μs In both Type 1 and Type 2 frame structures, the concept of lots is only used to describe the dimensions of various resource blocks. For FDD, 10 subframes are available for downlink transmission and 10 subframes are available for uplink transmissions in each 10 ms interval. Each subframe duration is 1 ms. Uplink and downlink transmissions are separated in the frequency domain.

Figure 7B:
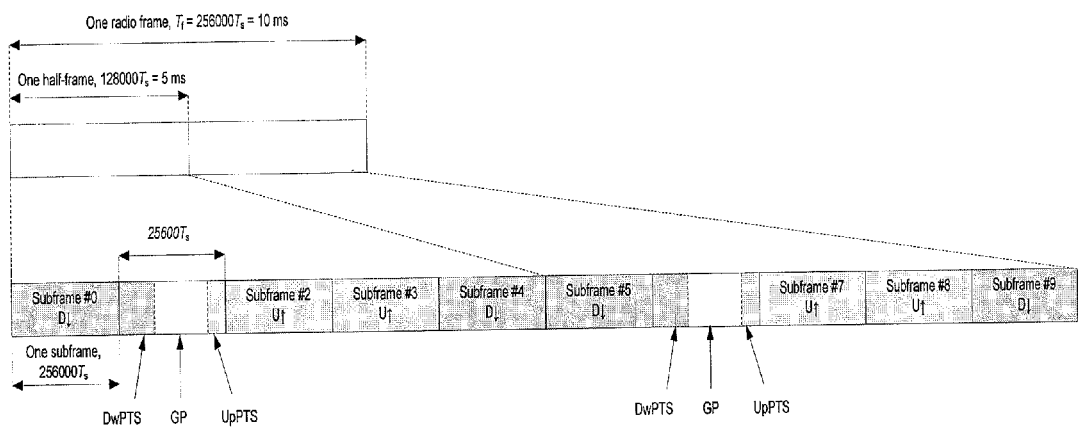

For LTE-Advanced TDD mode, for example, frame structure Type 2 can be used (see FIG. 7(b). Each radio frame of length of 10 ms consists of two half-frames of length ms each. Each half-frame consists of five subframes of length 1 ms. For each subframe in a radio frame, "D" denotes the subframe is reserved for downlink transmissions, "U" denotes the sub-frame is reserved for uplink transmissions and "S" denotes a special subframe with the three fields DwPTS, GP and UpPTS.

Uplink-downlink configurations with both 5 ms and 10 ms downlink-to-uplink switch-point periodicity may be supported. In case of 5 ms downlink-to-uplink switch-point periodicity, the special subframe exists in both half-frames. In case of 10 ms downlink-to-uplink switch-point periodicity, the special subframe may exist in the first half-frame.

According to an embodiment, subframes 0 and 5 and DwPTS are always reserved for downlink transmission. UpPTS and the subframe immediately following the special subframe are always reserved for uplink transmission. However, one of ordinary skill in the art would realize that various modifications could be made without departing from the scope of the present disclosure. In case of FDD, operation with half duplex from the UE point of view can be supported.

Table 5 below provides exemplary uplink-downlink configurations:

TABLE 5

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 6 below provides exemplary configurations of a special subframe S:

TABLE 6

| Special subframe configuration | Normal cyclic prefix in downlink | | Extended cyclic prefix in downlink | |
|---|---|---|---|---|
| | DwPTS ($N_{symbol}$) | UpPTS ($N_{symbol}$) | DwPTS ($N_{symbol}$) | UpPTS ($N_{symbol}$) |
| 0 | 3 | 1 | 3 | 1 |
| 1 | 7 | 1 | 6 | 1 |
| 2 | 8 | 1 | 7 | 1 |
| 3 | 9 | 1 | 8 | 1 |
| 4 | 10 | 1 | 3 | 2 |
| 5 | 3 | 2 | 6 | 2 |
| 6 | 7 | 2 | 7 | 2 |
| 7 | 8 | 2 | | |
| 8 | 9 | 2 | | |

In IEEE 802.16m frame structures, the concept of a radio superframe is introduced. A superframe last for 20 ms. There can be 4 frames within a superframe, where each frame length is 5 ms. A frame has the same duration of a half-frame of Type 2 described above.

According to certain embodiments, two radio frame structures can be supported by IEEE 802.16m:

Type 3—applicable to IEEE 802.16m FDD and TDD modes; and

Type 4—Optional frame structure for IEEE 802.16m FDD and TDD modes.

Figure 8A:
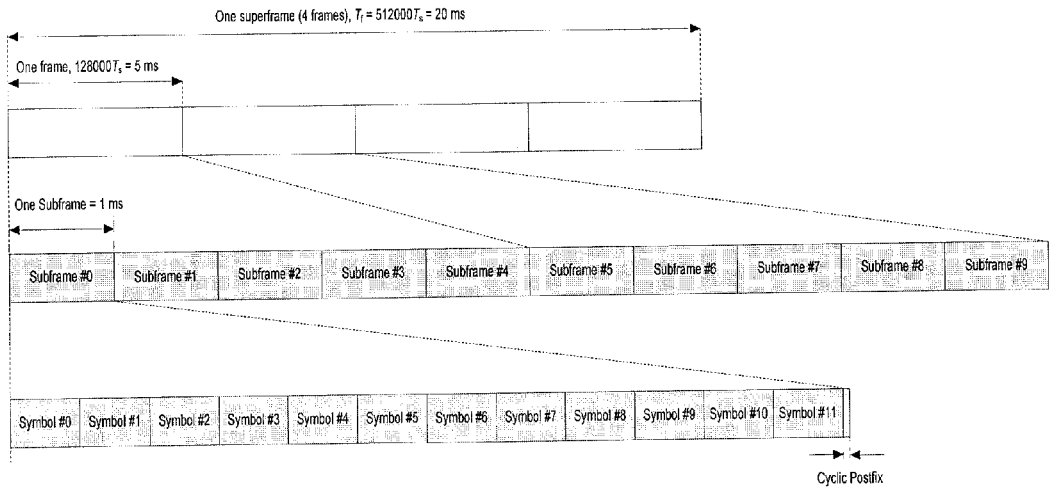
FIGS. 8(a) and 8(b) provide exemplary frame structures for Type 3 frame structures for FDD mode and TDD mode, respectively, according to an embodiment.
Figure 8B:
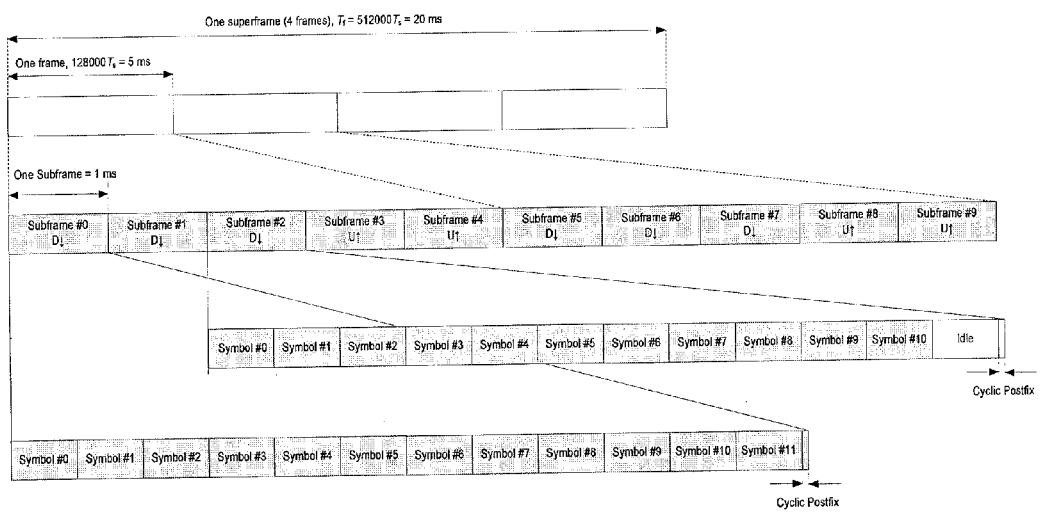

FIGS. 8(a) and 8(b) provide exemplary frame structures for Type 3 frame structures for FDD mode and TDD mode, respectively, according to an embodiment. Frame Structure Type 3 is similar to Frame Structure Type 1 described above, with an improved cyclic prefixes selection. Type 3 can be used to support both FDD and TDD modes. There are 10 subframe within a 5 ms radio frame, each subframe is 1 ms long. The common subframe parameters are provided in Table 7.

TABLE 7

| Sub-carrier Spacing (Δf, Δf$_{low}$, Δf$_{hi}$) | | KHz | 12.5 | 6.25 | 25 |
|---|---|---|---|---|---|
| Subframe Duration | | ms | 1 | 1 | 1 |
| Number of Ts | | ms | 25600 | 25600 | 25600 |
| CP Length | Normal CP1 | $T_s$ | 85 | 170 | 195 |
| ($T_{CP}$) | Extended CP2 | $T_s$ | 512 | 1024 | 682 |
| | CP3 | $T_s$ | 279 | | 89 |
| | CP4 | $T_s$ | 796 | | 398 |
| Number of OFDM | | $N_{CP1}$ | 12 | 6 | 21 |
| Symbols Per Subframe | | $N_{CP2}$ | 10 | 5 | 15 |
| | | $N_{CP3}$ | 11 | | 23 |
| | | $N_{CP4}$ | 9 | | 18 |

TABLE 7-continued

| | | | | | |
|---|---|---|---|---|---|
| Extra | $n_{CP1}$ | $T_S$ | 4 | 4 | 1 |
| Samples | $n_{CP2}$ | | 0 | 0 | 10 |
| for Subframe | $n_{CP3}$ | | 3 | | 1 |
| Idle Time | $n_{CP4}$ | | 4 | 4 | |

In the case of 12.5 kHz sub-carrier spacing there are 4 cyclic-prefix (CP) lengths. These are CP choices for a 1-ms subframe, corresponding to 12, 10, 11, and 9 OFDM symbols per subframe, respectively.

Normal cyclic prefix 1: $T_{CP1}$=85×Ts (OFDM symbol #0 to #11)=3.3203125 μs, cyclic postfix=4×Ts=0.15625 μs Extended cyclic prefix 2: $T_{CP2}$=512×Ts (OFDM symbol #0 to #9)=20 μs Cyclic prefix 3: $T_{CP3}$=279×Ts (OFDM symbol #0 to #10)= 10.8984375 μs, cyclic postfix=3×Ts=0.1171875 μs Cyclic prefix 4: $T_{CP4}$=796×Ts (OFDM symbol #0 to #8)=31.09375 μs, cyclic postfix=4×Ts=0.15625 μs, where $T_s$=1/(2048×Δf)

In the case of 6.25 kHz sub-carrier spacing there are 2 cyclic-prefix (CP) lengths. These are CP choices for a 1-ms subframe, corresponding to 6, and 5 OFDM symbols per subframe respectively.

Low Δf cyclic prefix 1: $T_{CP-low1}$=170×Ts (OFDM symbol #0 to #5)=6.640625 μs, cyclic postfix=4×Ts=0.15625 μs Low Δf cyclic prefix 2: $T_{CP-low1}$=1024×Ts (OFDM symbol #0 to #4)=40 μs In the case of 25 kHz sub-carrier spacing there are 2 cyclic-prefix (CP) lengths. These are CP choices for a 1-ms subframe, corresponding to 21, and 15 OFDM symbols per subframe respectively.

High Δf cyclic prefix 1: $T_{CP-hi1}$=195×Ts (OFDM symbol #0 to #20)=7.6171875 μs, cyclic postfix=1×Ts=0.0390625 μs High Δf cyclic prefix 2: $T_{CP-hi2}$=682×Ts (OFDM symbol #0 to #14)=26.640625 μs, cyclic postfix=10×Ts=0.390625 μs High Δf cyclic prefix 3: $T_{CP-hi3}$=89×Ts (OFDM symbol #0 to #22)=3.4765625 μs, cyclic postfix=1×Ts=0.0390625 μs High Δf cyclic prefix 4: $T_{CP-hi4}$=398×Ts (OFDM symbol #0 to #17)=15.546875 μs, cyclic postfix=4×Ts=0.15625 μs.

For Type 3 TDD mode (see FIG. 8(b)), a subframe is also the smallest unit to be configurable for downlink and uplink transmission. As shown in FIG. 8(b), Subframe# 0 is always reserved for downlink transmission. Starting from Subframe# 1, each subframe can be configurable for downlink or uplink transmission. For each subframe in a radio frame, "D" denotes the subframe is reserved for downlink transmission, "U" denotes the subframe is reserved for uplink transmission. The concept of slots is only used to describe the dimensions of resource blocks, according to this example.

Downlink-uplink configurations with 5 ms, 10 ms, and 20 ms downlink-to-uplink switch-point periodicity are supported. In case of 5 ms downlink-to-uplink switch-point periodicity, the switch-point exists in each frame. In case of 10 ms downlink-to-uplink switch-point periodicity, the switch-point exists in only one of the two frames. In case of 20 ms downlink-to-uplink switch-point periodicity, the switch-point only exists in one of the four frames. Multiple switch-points are also supported within a 5-ms frame as optional features to support such as extremely high mobility performance where very fast feedbacks are required.

In the superframe configuration, "D" denotes the frame is reserved for downlink transmission, "U" denotes the frame is reserved for uplink transmission. "X" denotes the frame can be configured as indicated by the Frame Configuration Index in Table 8 below.

TABLE 8

| Superframe Configuration Index (SCI) | Downlink-to-Uplink Switch-point periodicity | Frame number | | | |
|---|---|---|---|---|---|
| | | 0 | 1 | 2 | 3 |
| 0 | 5 ms | X | X | X | X |
| 1 | 10 ms | X | D | X | D |
| 2 | 20 ms | D | D | D | X |
| 3 | 10 ms | X | U | X | U |

The TDD adjacent channel coexistence with Frame Structure Type 2 can also be resolved by Frame Structure Type 3 in TDD mode with Frame Configuration Index 9 to 15, as shown in Table 9 below. These configurations can be used to inline the downlink-to-uplink switch-points with that of TDD system operating in Frame Structure Type 2, and what will be potentially deployed TDD-LTE. The smallest switch-point periodicity is 2 ms to allow channel fast feedback mechanism.

TABLE 9

| Frame Configuration Index (FCI) | Switch-point Periodicity | Slot number of "X" frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | D | D | U | U | D | D | U | U | U |
| 1 | 5 ms | D | D | D | U | U | D | D | D | U | U |
| 2 | 5 ms | D | D | D | D | U | D | D | D | D | U |
| 3 | 5 ms | D | D | U | U | U | D | D | U | U | D |
| 4 | >5 ms | D | D | D | D | D | D | D | D | D | D |
| 5 | ≤3 ms | D | D | U | D | U | D | D | U | D | U |
| 6 | ≤3 ms | D | D | U | D | U | D | U | U | D | U |
| 7 | 2 ms | D | U | D | U | D | U | D | U | D | U |
| 8 | ≤3 ms | D | U | D | U | D | U | U | U | D | U |
| 9 | 5 ms | D | S | U | U | U | D | S | U | U | U |
| 10 | 5 ms | D | S | U | U | D | D | S | U | U | D |
| 11 | 5 ms | D | S | U | D | D | D | S | U | D | D |
| 12 | 10 ms | D | S | U | U | D | D | D | D | D | D |
| 13 | 10 ms | D | S | U | U | D | D | D | D | D | D |
| 14 | 10 ms | D | S | U | D | D | D | D | D | D | D |
| 15 | 5 ms | D | S | U | U | U | D | S | U | U | D |

Figure 9:
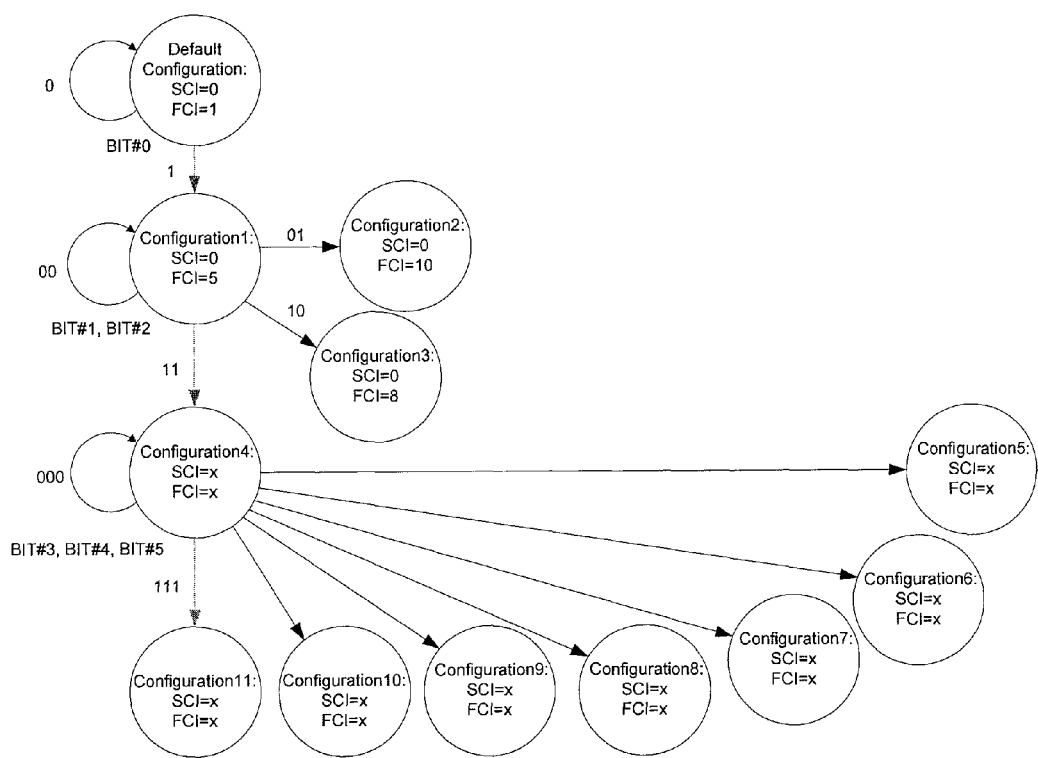
FIG. 9 illustrates superframe and frame configurations with trie data structures, according to an embodiment.

When a network is deployed, a superframe is often configured to a default system profile. However, a superframe can change its frame structure via superframe control signaling. There are many different superframe and frame configurations available for different networks deployment. However, it is believed that only limited set of configurations are practically used within a particular network. In order to minimize the number of bits for superframe and frame configurations to be transmitted in the air by superframe header the trie data structure is used to broadcast configurations information. If the network is operating in default configuration, only one bit is transmitted in the air to indicate that the superframe and frames are configured in default mode. An example is provided with reference to Table 10 below and FIG. 9, where the values of Superframe Configuration Index (SCI) and Frame Configuration Index (FCI) in FIG. 9 are selected for illustration purpose, and are not intended to limit the embodiment in any way.

TABLE 10

| | | | |
|---|---|---|---|
| Bit#0 = 0 | System Default Configuration#0: SCI = x0, FCI = y0 | | |
| Bit#0 = 1 | Bit#1 = 0, Bit#2 = 0 | Configuration#1: SCI = x1, FCI = y1 | |
| | Bit#1 = 0, Bit#2 = 1 | Configuration#2: SCI = x2, FCI = y2 | |
| | Bit#1 = 1, Bit#2 = 0 | Configuration#3: SCI = x3, FCI = y3 | |
| | Bit#1 = 1, Bit#2 = 1 | Bit#3 = 0, Bit#4 = 0, Bit#5 = 0 | Configuration#4: SCI = x4, FCI = y4 |
| | | Bit#3 = 0, Bit#4 = 0, Bit#5 = 1 | Configuration#5: SCI = x5, FCI = y5 |
| | | Bit#3 = 0, Bit#4 = 1, Bit#5 = 0 | Configuration#6: SCI = x6, FCI = y6 |
| | | Bit#3 = 0, Bit#4 = 1, Bit#5 = 1 | Configuration#7: SCI = x7, FCI = y7 |
| | | Bit#3 = 1, Bit#4 = 0, Bit#5 = 0 | Configuration#8: SCI = x8, FCI = y8 |
| | | Bit#3 = 1, Bit#4 = 0, Bit#5 = 1 | Configuration#9: SCI = x9, FCI = y9 |
| | | Bit#3 = 1, Bit#4 = 1, Bit#5 = 0 | Configuration#10: SCI = x10, FCI = y10 |
| | | Bit#3 = 1, Bit#4 = 1, Bit#5 = 1 | Configuration#11: SCI = x11, FCI = y11 |

Note:
Notations of x0 to x11 in the above table are representation of Superframe Configuration Index values, and y0 to y11 are representation of Frame Configuration Index values, according to this embodiment.

In the Type 4 frame structure, the concept of subframe is removed. A 5-ms frame is made of multiple slots. A regular frame contains up to 10 slots. The concept of slots is used to describe the dimensions of resource blocks. Each slot contains 6 OFDM symbols. For FDD, all frames are available for downlink transmission and all frames are available for uplink transmissions in each 20 ms superframe interval. Uplink and downlink transmissions are separated in the frequency domain.

Figure 10A:
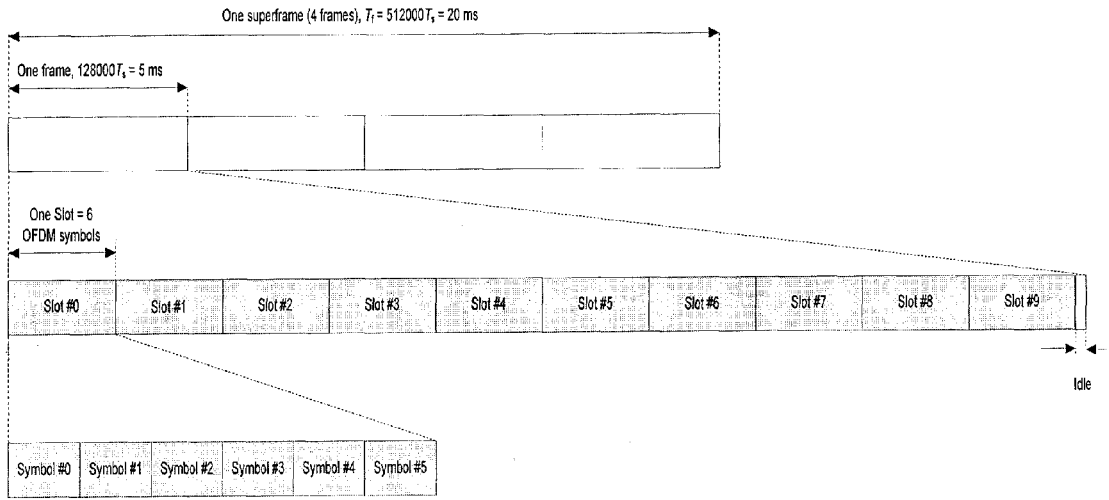
FIGS. 10(a) and 10(b) provide exemplary frame structures for Type 4 frame structures for FDD mode and TDD mode, respectively, according to an embodiment.
Figure 10B:
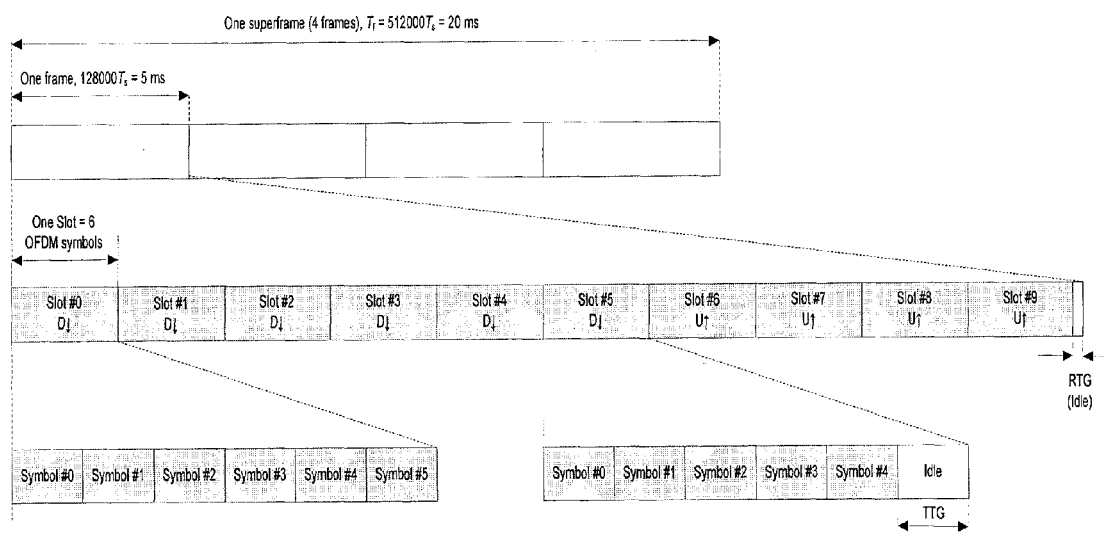

FIGS. 10(a) and 10(b) provide exemplary frame structures for Type 4 frame structures for FDD mode and TDD mode, respectively, according to an embodiment. The frame parameters are provided in Table 11.

TABLE 11

| Sub-carrier Spacing ($\Delta f$, $\Delta f_{low}$, $\Delta f_{hi}$) | KHz | 12.5 | 6.25 | 25 |
|---|---|---|---|---|
| Frame Duration | ms | 5 | 5 | 5 |
| Number of Ts | ms | 128000 | 128000 | 128000 |
| CP Length | CP1 $T_s$ | 85 | 170 | 161 |
| ($T_{CP}$) | CP2 $T_s$ | 322 | 644 | 230 |
| | CP3 $T_s$ | 618 | | 309 |
| | CP4 $T_s$ | | | 617 |
| Number of OFDM | $N_{CP1}$ | 60 | 30 | 108 |
| Symbols Per Frame | $N_{CP2}$ | 54 | 27 | 102 |
| | $N_{CP3}$ | 48 | | 96 |
| | $N_{CP4}$ | | | 78 |
| Extra Samples | $n_{CP1}$ $T_S$ | 20 | 20 | 20 |
| for Frame Idle Time | $n_{CP2}$ | 20 | 20 | 92 |
| | $n_{CP3}$ | 32 | | 32 |
| | $n_{CP4}$ | | | 2 |

In the case of 12.5 kHz sub-carrier spacing there are 3 cyclic-prefix (CP) lengths. These are CP choices for a 5-ms frame, corresponding to 60, 54, and 48 OFDM symbols per frame respectively.

Cyclic prefix 1: $T_{CP1}$=85×Ts (OFDM symbol #0 to #59)= 3.3203125 µs, frame idle time=20×Ts=0.78125 µs Cyclic prefix 2: $T_{CP2}$=322×Ts (OFDM symbol #0 to #53)= 12.578125 µs, frame idle time=20×Ts=0.78125 µs Cyclic prefix 3: $T_{CP3}$=618×Ts (OFDM symbol #0 to #47)= 24.140625 µs, frame idle time=32×Ts=1.25 µs, where $T_s$=1/(2048×$\Delta f$)

In the case of 6.25 kHz sub-carrier spacing there are 2 cyclic-prefix (CP) lengths. These are CP choices for a 5-ms frame, corresponding to 30, and 27 OFDM symbols per frame respectively.

Low $\Delta f$ cyclic prefix 1: $T_{CPL1}$=170×Ts (OFDM symbol #0 to #29)=6.6406255 µs, frame idle time=20×Ts=0.78125 µs Low $\Delta f$ cyclic prefix 2: $T_{CPL2}$=644×Ts (OFDM symbol #0 to #26)=25.15625 µs, frame idle time=20×Ts=0.78125 µs In the case of 25 kHz sub-carrier spacing there are 4 cyclic-prefix (CP) lengths. These are CP choices for a 5-ms frame, corresponding to 108, 102, 96, and 78 OFDM symbols per frame respectively.

High $\Delta f$ cyclic prefix 1: $T_{CPH1}$=161×Ts (OFDM symbol #0 to #107)=6.2890625 µs, frame idle time=20×Ts=0.78125 µs High $\Delta f$ cyclic prefix 2: $T_{CPH2}$=230×Ts (OFDM symbol #0 to #101)=8.984375 µs, frame idle time=92×Ts=3.59375 µs High $\Delta f$ cyclic prefix 3: $T_{CPH3}$=309×Ts (OFDM symbol #0 to #95)=12.0703125 µs, frame idle time=32×Ts=1.25 µs High $\Delta f$ cyclic prefix 4: $T_{CPH4}$=617×Ts (OFDM symbol #0 to #77)=24.1015625 µs, frame idle time=2×Ts=0.078125 µs For Type TDD mode, as shown in FIG. 10(b), a superframe consists of 4 frames, each frame is made of multiple slots. A regular frame contains up to 10 slots. The concept of slots is not only used to describe the dimensions of resource blocks, it is also the smallest unit to be configurable for downlink and uplink transmission. Each slot contains 6 OFDM symbols as shown in FIG. 10(b). Slot 0 is always reserved for downlink transmission. Starting from Slot 1, each slot can be configurable for downlink or uplink transmission. Slot durations in different frames may vary depending on the selected CP sizes. For each slot in a radio frame, "D" denotes the slot is reserved for downlink transmission, "U" denotes the slot is reserved for uplink transmission.

Downlink-uplink configurations with 5 ms, 10 ms, and 20 ms downlink-to-uplink switch-point periodicity are supported. In case of 5 ms downlink-to-uplink switch-point periodicity, the switch-point exists in each frame. In case of 10 ms downlink-to-uplink switch-point periodicity, the switch-point may exist in only one of the two frames. In case of 20 ms downlink-to-uplink switch-point periodicity, the switch-point only exists in one of the four frames. Multiple switch-points are also supported within a 5-ms frame as optional features to support such as extremely high mobility performance where faster feedbacks are required.

In the superframe configuration, as shown in Table 12 below, "D" denotes the frame is reserved for downlink transmission, "U" denotes the frame is reserved for uplink transmission. "X" denotes the frame can be configured as indicated by the Frame Configuration Index in Table 13 below.

TABLE 12

| Superframe Configuration Index (SCI) | Downlink-to-Uplink Switch-point Periodicity | Frame number | | | |
|---|---|---|---|---|---|
| | | 0 | 1 | 2 | 3 |
| 0 | 5 ms | X | X | X | X |
| 1 | 10 ms | X | D | X | D |
| 2 | 20 ms | D | D | D | X |
| 3 | 10 ms | X | U | X | U |

The TDD adjacent channel coexistence with Frame Structure Type 2 can also be resolved by Frame Structure Type 4 in TDD mode with Frame Configuration Index 3 to 7 (see Table 13 below). These configurations can be used to inline the downlink-to-uplink switch-points with that of TDD system operating in Frame Structure Type 2.

TABLE 13

| Frame Configuration Index (FCI) | Switch-point Periodicity | Slot number of "X" frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | D | D | D | D | U | U | U | U | U |
| 1 | 5 ms | D | D | D | D | D | D | U | U | U | U |
| 2 | >5 ms | D | D | D | D | D | D | D | D | D | D |
| 3 | 5 ms | D | D | D | U | U | U | U | U | U | U |
| 4 | 5 ms | D | D | D | D | U | U | U | U | U | U |
| 5 | 5 ms | D | D | D | U | U | U | U | D | D | D |
| 6 | 5 ms | D | D | D | D | U | U | U | U | D | D |
| 7 | 5 ms | D | D | U | U | D | D | D | D | D | D |
| 8 | 5 ms | D | D | D | D | D | D | D | U | U | U |
| 9 | 5 ms | D | D | D | D | D | D | D | D | U | U |
| 10 | ≤5 ms | D | D | D | U | U | D | D | D | U | U |
| 11 | ≤5 ms | D | D | D | D | U | D | D | D | D | U |
| 12 | ≤5 ms | D | D | U | U | U | D | D | U | U | U |
| 13 | ≤5 ms | D | U | U | U | U | D | U | U | U | U |
| 14 | ≤5 ms | D | D | U | D | U | D | U | D | U | D |
| 15 | ≤5 ms | D | D | U | U | D | D | U | U | D | D |

A physical resource block is defined as $N_{symb}$ consecutive OFDM symbols in the time domain and $N_{sc}^{RB}$ consecutive subcarriers in the frequency domain, where $N_{symb}$ and $N_{sc}^{RB}$ are updated in Table 14. A physical resource block in the uplink thus consists of a number of resource elements corresponding to one slot in the time domain and 180 kHz in the frequency domain.

TABLE 14

| Frame Structure Configuration | Sub-carrier Spacing | Cyclic Prefix | $N_{symb}$ | $N_{sc}^{RB}$ |
|---|---|---|---|---|
| Type 1, Type 2 | Δf = 12.5 kHz | Normal CP1 | 6 | 12 |
| | | Extended CP2 | 5 | |
| | Δf = 6.25 kHz | CP-Low | 3 | 24 |
| Type 3 | Δf = 12.5 kHz | CP1 | 6 | 16 |
| | | CP2 | 5 | |
| | | CP3 | 6, 5 | |
| | | CP4 | 6, 3 | |
| | Δf = 6.25 kHz | CP1 | 6 | 16 |
| | | CP2 | 5 | |
| | Δf = 25 kHz | CP1 | 6, 3 | |
| | | CP2 | | |
| | | CP3 | 6, 5 | |
| | | CP4 | 6 | |
| Type 4 | Δf = 12.5 kHz | CP1, CP2, CP3 | 6 | 16 |
| | Δf = 6.25 kHz | CPL1, CPL2 | | |
| | Δf = 25 kHz | CPH1, CPH2, CPH3, CPH4 | | |

Table 15 below provides examples of supported system bandwidths. Of course, the supported system bandwidths are merely for exemplary purposes and are not intended to limit the scope of the disclosure in any way.

TABLE 15

| Parameter | Unit | | Parameter Values | | | | | | | |
|---|---|---|---|---|---|---|---|---|---|---|
| Channel Bandwidth (BW) | MHz | | 1.4 | 2.5 | 3 | 3.5 | 5 | 6 | 7 | 8 |
| Number of Used sub-carriers (Nused) | $N_{sc}^{RB}$ 12 | Sub-carrier | 108 | 192 | 240 | 276 | 396 | 480 | 552 | 636 |
| | $N_{sc}^{RB}$ 16 | | 112 | 192 | 240 | 272 | 400 | 480 | 560 | 640 |

| Parameter | Unit | | Parameter Values (Continue) | | | | | | | |
|---|---|---|---|---|---|---|---|---|---|---|
| Channel Bandwidth (BW) | MHz | | 8.75 | 10 | 11 | 12 | 14 | 15 | 20 | 40 |
| Number of Used sub-carriers (Nused) | $N_{sc}^{RB}$ 12 | Sub-carrier | 696 | 792 | 876 | 960 | 1116 | 1200 | 1596 | 3192 |
| | $N_{sc}^{RB}$ 16 | | 688 | 800 | 880 | 960 | 1120 | 1200 | 1600 | 3200 |

Figure 11:
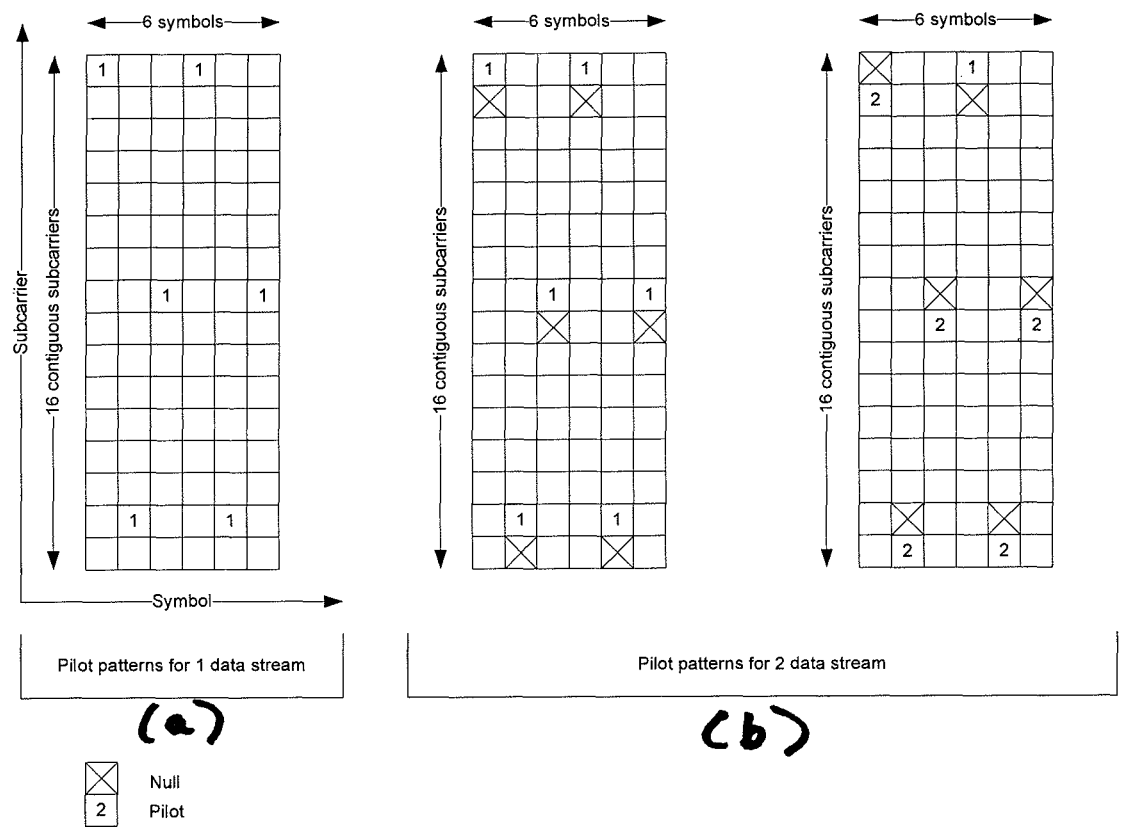
FIGS. 11(a) and 11(b) show exemplary pilot patterns for 1 and 2 data streams, respectively, according to an embodiment.

According to certain embodiments, pilot patterns may be specified within a resource block for Type 3 and Type 4 resource blocks. FIGS. 11(a) and 11(b) show exemplary pilot patterns for 1 and 2 data streams, respectively.

Figure 12:
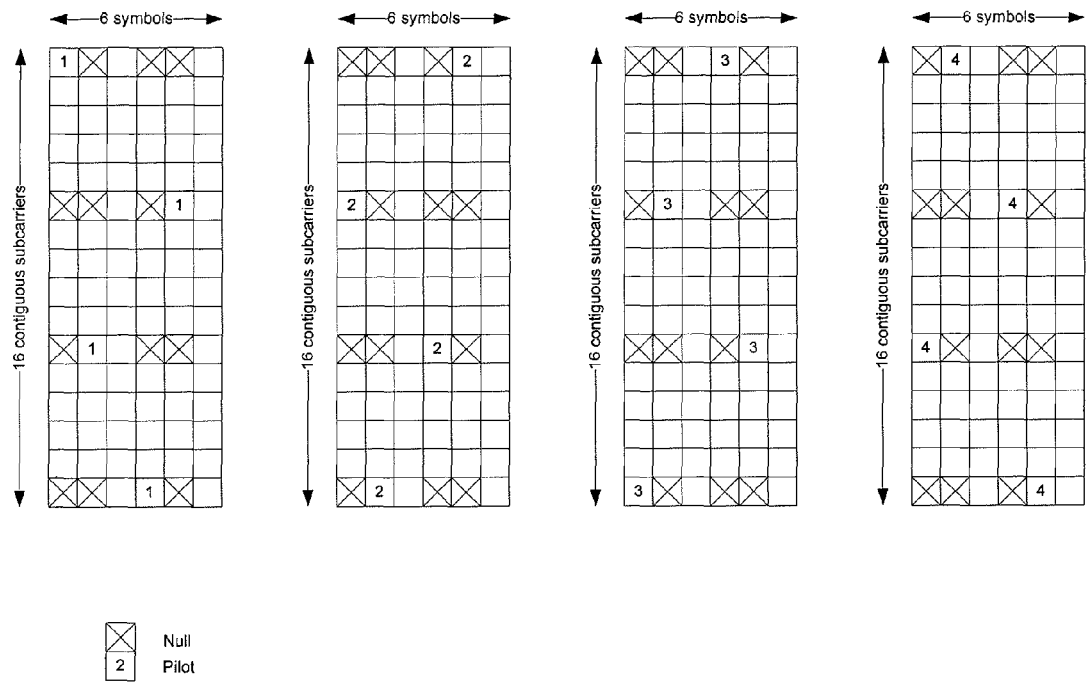
FIG. 12 shows exemplary pilot patterns for 4 data streams, according to an embodiment.

FIG. 12 shows exemplary pilot patterns for 4 data streams, according to an embodiment of the present disclosure.

Figure 13:
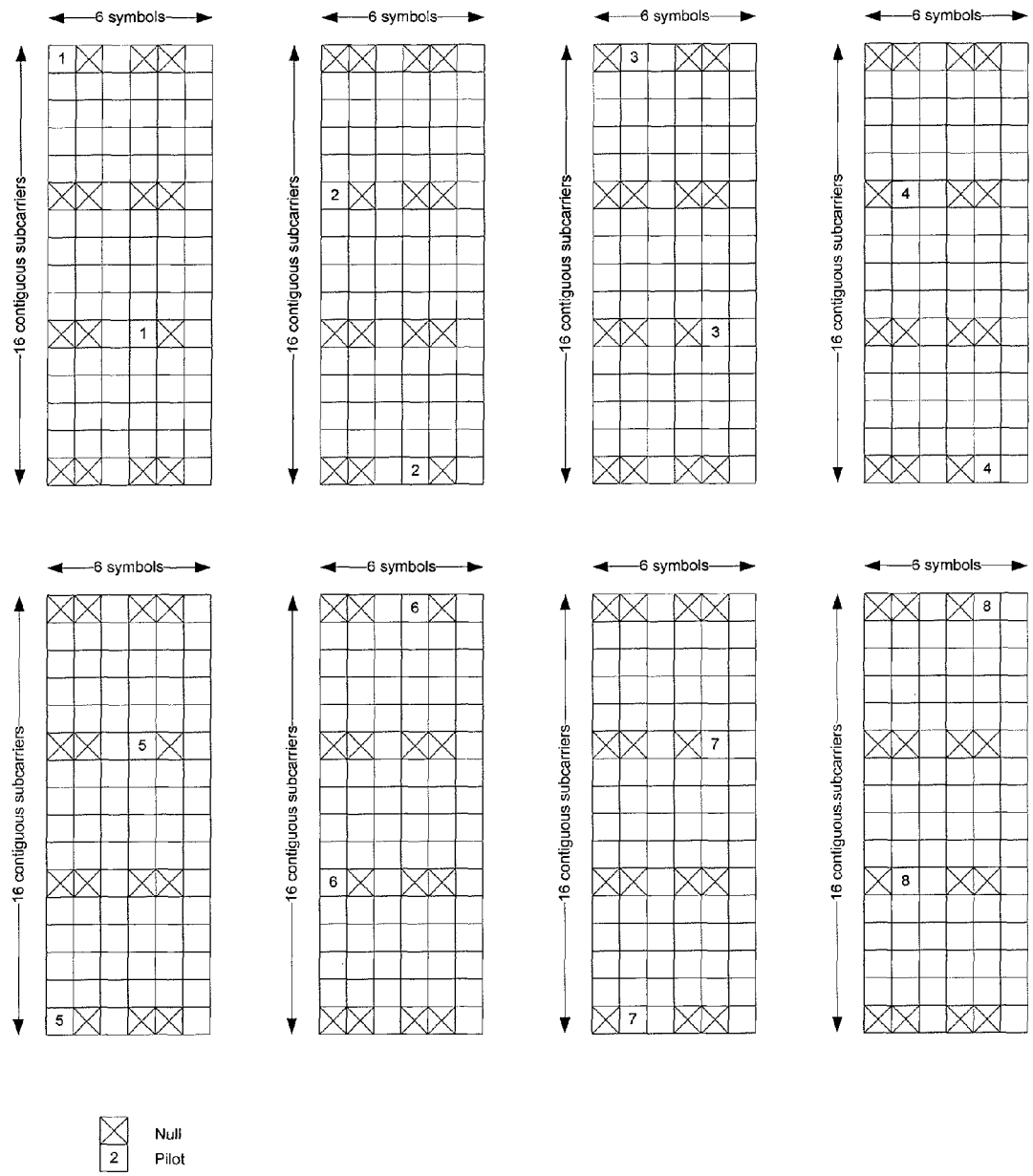
FIG. 13 shows exemplary pilot patterns for 8 data streams, according to an embodiment of the present disclosure.

FIG. 13 shows exemplary pilot patterns for 8 data streams, according to an embodiment of the present disclosure.

For $N_{symb}=5$, the last symbol of the pilot patterns as shown in FIGS. 11(a)-119b) or FIG. 12 is deleted. Similarly for $N_{symb}=3$, the last three symbols of the pilot patterns are deleted, according to an exemplary embodiment.

Figure 14:
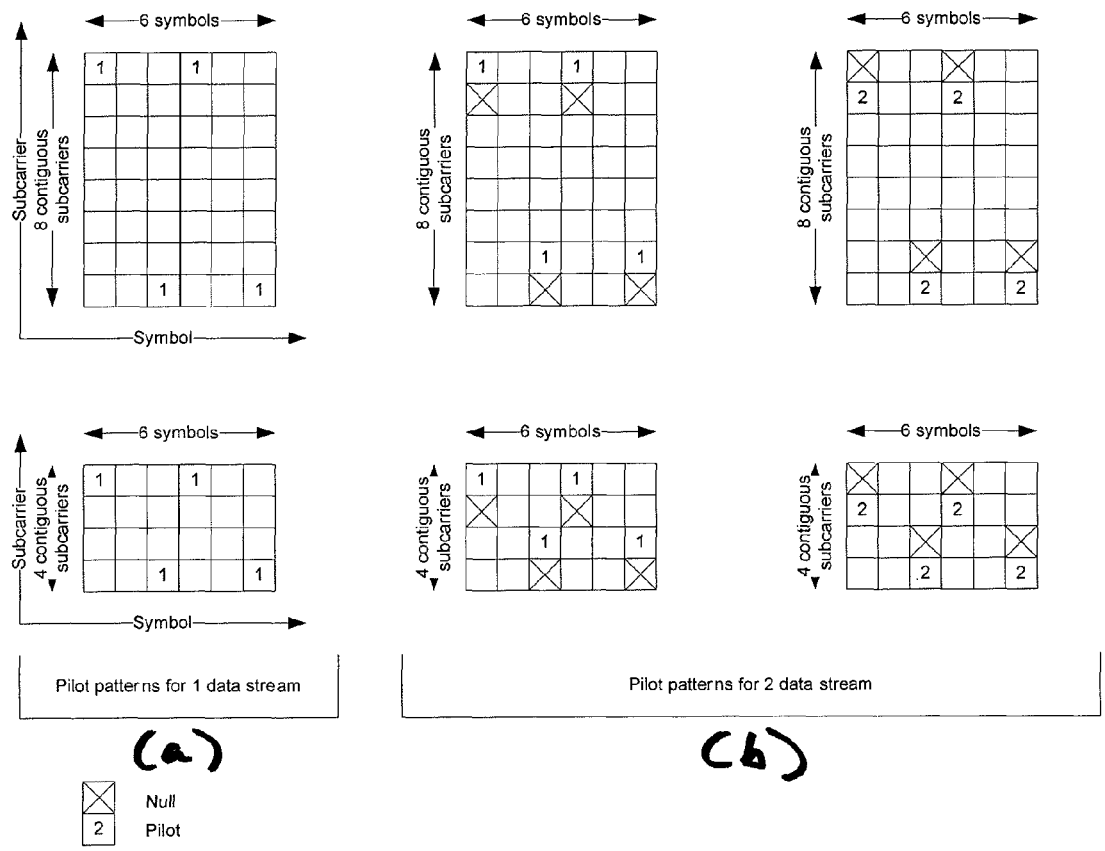
FIGS. 14(a) and 14(b) show pilot patterns for uplink only distributed resource blocks, according to an embodiment.

FIGS. 14(a) and 14(b) show pilot patterns for uplink only distributed resource blocks (also known as LRU). For $N_{symb}=5$, the last symbol of the pilot patterns as shown in FIG. 13 or FIGS. 14(a)-14(b) is deleted. Similarly for $N_{symb}=3$, the last three symbols of the pilot patterns are deleted.

Figure 15:
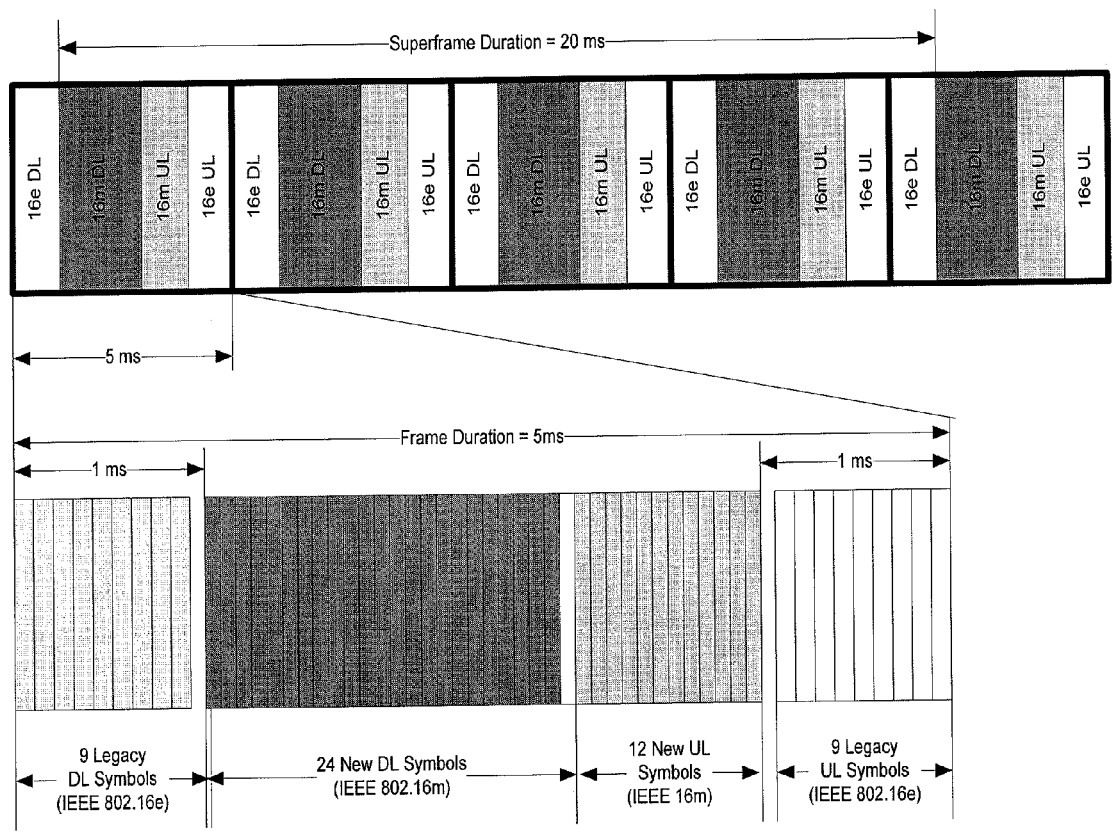
FIG. 15 shows an example of legacy support by frame structure Type 3 in TDD mode, according to an embodiment.
Figure 16:
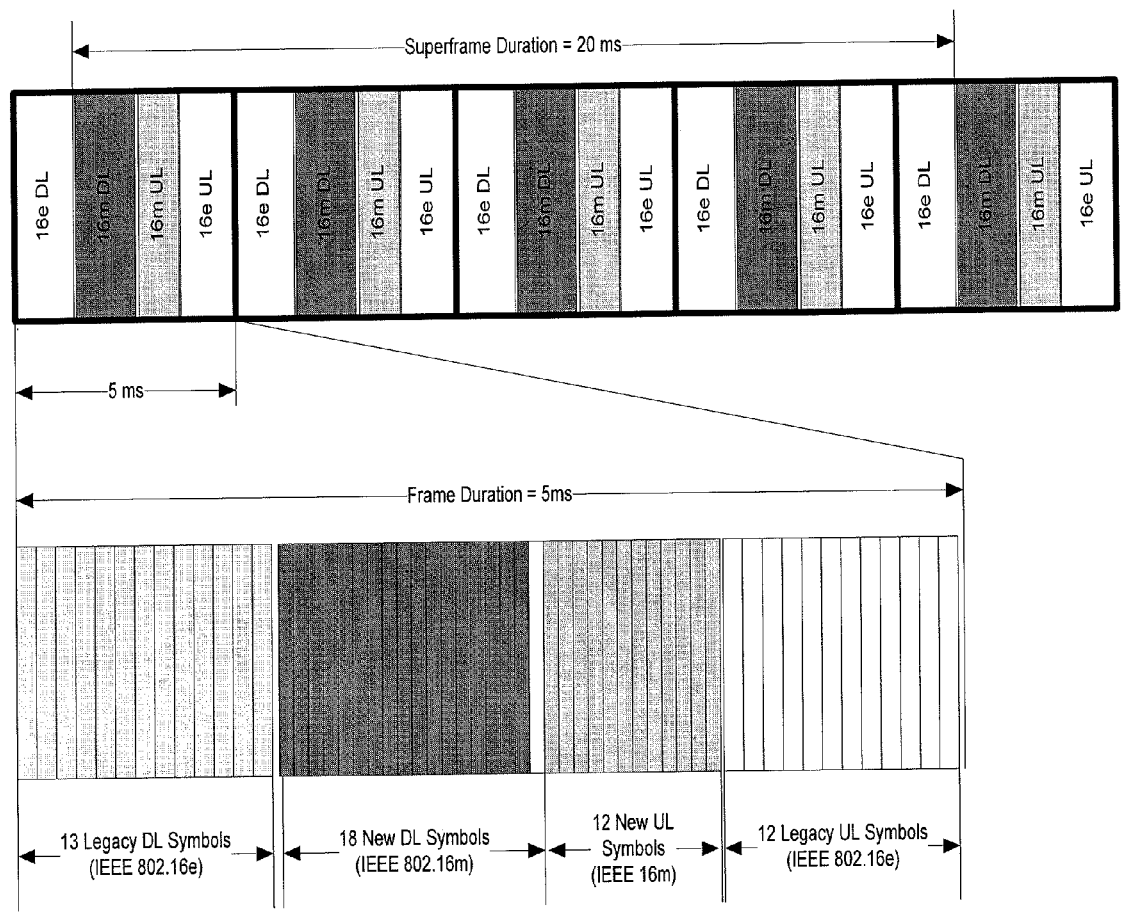
FIG. 16 shows an example of legacy support by frame structure Type 4 in TDD mode, according to an embodiment.

In a mixed deployment of legacy WiMAX (IEEE 802.16) and IEEE 802.16m systems, the allocation of time zones in the TDD mode is as shown in FIGS. 15 and 16 for Type 3 and 4 frame structures, respectively. The duration of the zones may vary. In this embodiment, every frame starts with a legacy preamble and the MAP followed by IEEE 802.16e DL zone since the legacy mobiles expect legacy zone in this region, then IEEE 802.16m DL zone for advanced mobiles. Similarly, in a mixed deployment, the UL portion starts with IEEE 802.16e UL zone since IEEE 802.16e UL control information is expected to be sent in this region, then followed by IEEE 802.16m UL zone for advanced mobiles. Here the coexistence is defined as a deployment where co-exist on the same frequency band and in the same or neighboring geographical areas. In a green-field deployment where no legacy mobile exists, the legacy zone can be removed. Switching points can be synchronized across network to reduce inter-cell interference.

Figure 17:
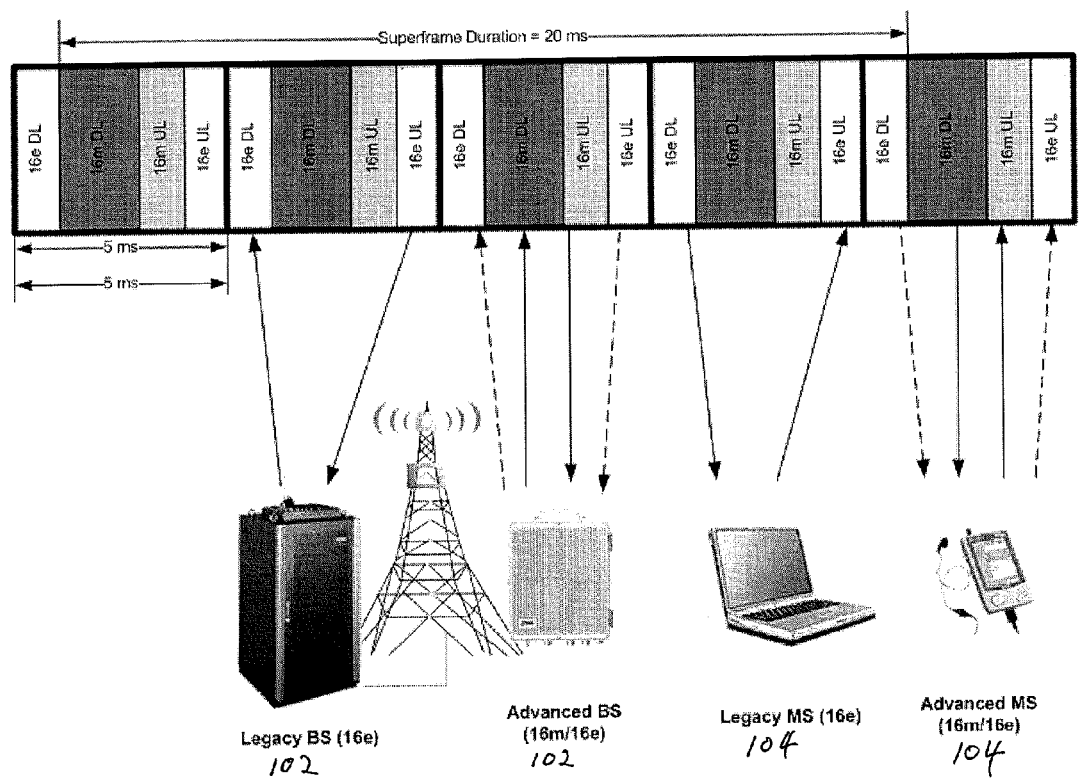
FIG. 17 shows an exemplary illustration of deployment with mixed base stations and mobile stations, according to an embodiment.

FIG. 17 shows an exemplary illustration of deployment with mixed base stations 102 and mobile stations 104, according to an embodiment. Of course, the present disclosure is not limited to any particular number or type of base stations 102 or mobile station 104.

Almost all the WiMAX (IEEE 802.16) deployments in the world are in multi-carrier deployment. A sector may be supporting a radio frequency carrier, or even multiple carriers. Each carrier has out-of-band interference to the neighboring carriers, which needs to be resolved by over 8% guard bands and RF filters. Proposed herein is a 12.5-kHz subcarrier spacing which is applied for all the channel bandwidth, e.g. 5/10/20 MHz, 3.5/7/14 MHz and also 8.75 MHz. A 12.5-kHz subcarrier spacing has a property of good trade-off of mobility and frequency efficiency with CP overhead, and divides evenly into the 250-kHz channel raster. The sampling frequency of different channel bandwidths will be based on this subcarrier spacing and appropriate FFT size. It means that all the channel bandwidths will have the same base sampling frequency. The mobile station 104 can roam to different carrier bandwidths in different frequency bands while utilizing the same OFDMA parameter set. This feature is important for a simplified coherent 4G standard and developing a healthy ecosystem, and beyond. Moreover, the Frame Structure Type 1, 2 and 3 can support backward compatibility to future LTE deployment.

Figure 18:
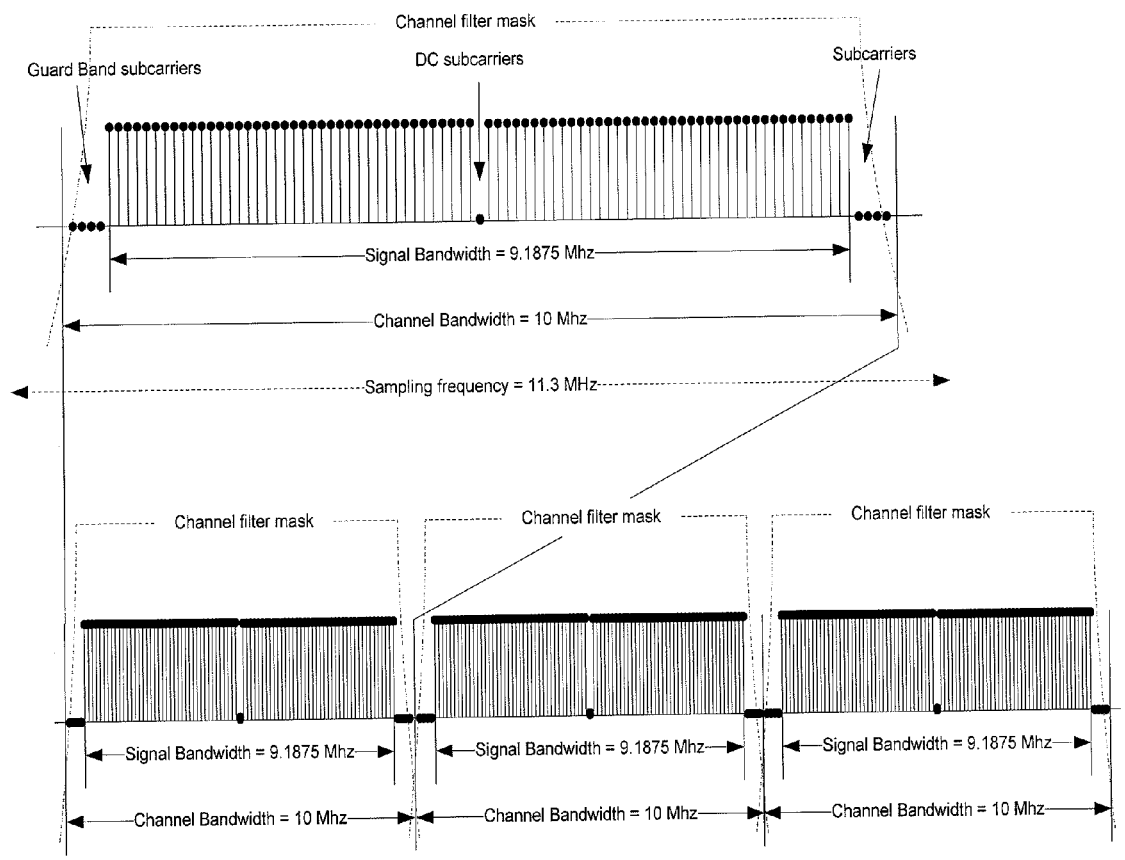
FIG. 18 shows an example of a legacy IEEE 802.16 system deployment with 10 MHz channel bandwidth, according to an embodiment.

FIG. 18 shows an example of a legacy IEEE 802.16 system deployment with 10 MHz channel bandwidth, according to an embodiment.

Figure 19:
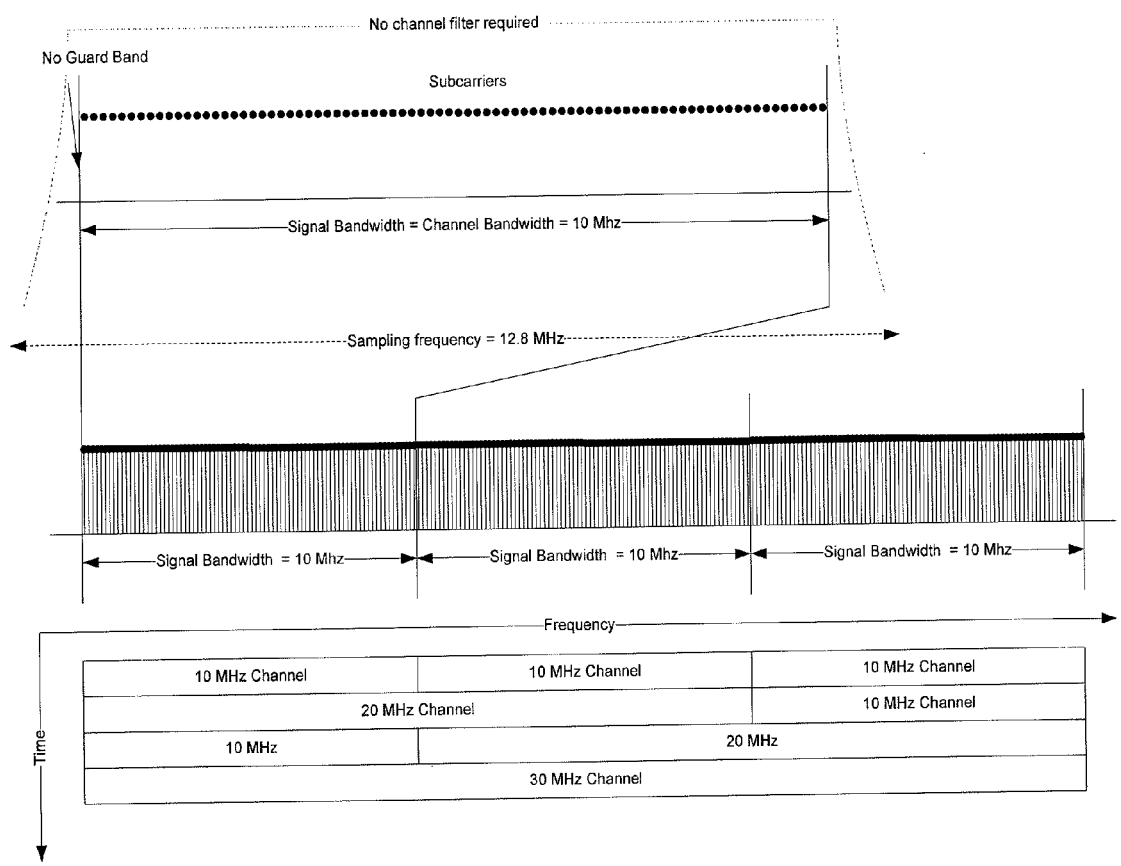
FIG. 19 shows an example of a multi-carrier deployment with 10, 20 and 30 MHz channel bandwidth, without guard bands, according to an embodiment.

FIG. 19 shows an example of a multi-carrier deployment with 10, 20 and 30 MHz channel bandwidth, without guard bands, according to an embodiment.

According to certain embodiments, there may be up to four CP lengths based on 12.5-kHz subcarrier spacing, which are used for different radio scenarios. These CP lengths are needed to adequately balance the required length of CP with the loss of capacity due to the CP in order to serve the breadth of radio environments envisaged for 802.16m. Among the different CP lengths, CP1 are the shortest CPs which are typically used for normal small cell deployments such as for urban and indoor, CP2 is typically used for extended cell coverage such as suburban environments, and long CP with 15 us duration is needed for the large delay spreads that may be encountered with large rural cells.

The number of used subcarriers is independent of permutation mode, according to an embodiment. For all the types of permutation modes, with the same bandwidth, the number of used subcarriers can be the same. With consideration of legacy system support, TDM mode can be used for DL and UL.

Based on the Frame Structure Type 1, 2 and 3, the system can be configurable to support multiple CP lengths in the same BS 102 and in the same frame. This feature is particular useful for deployment of mixed Macro, Micro, Pico, and Femto cells and mixed mobile and fixed applications.

Figure 20:
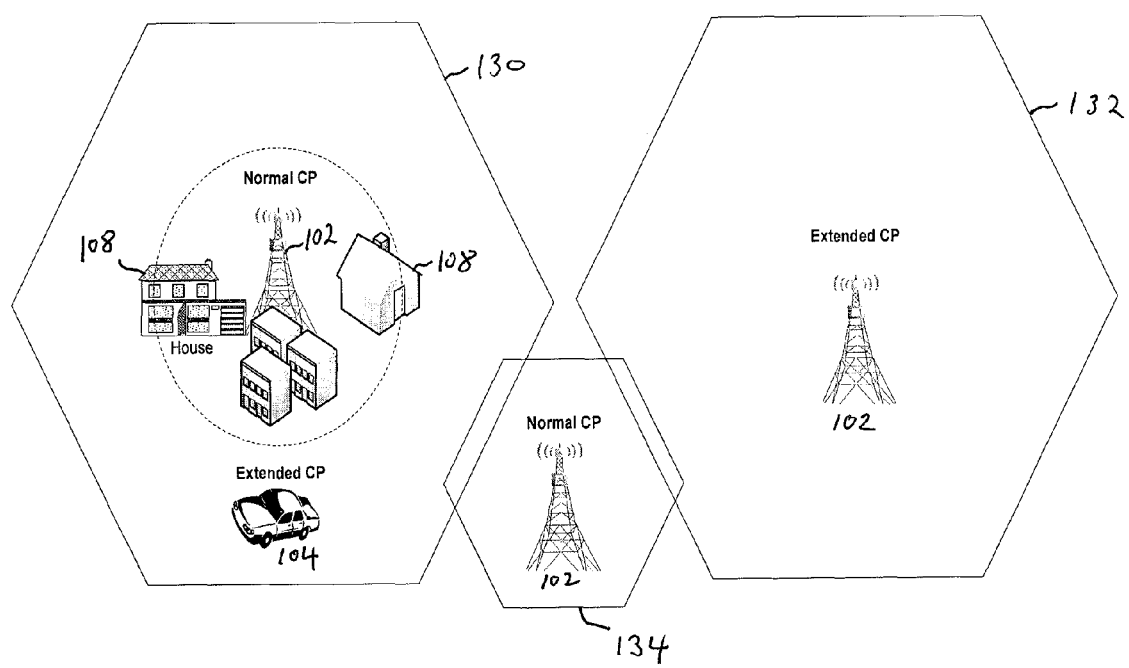
FIG. 20 illustrates a multi-CP network deployment for frame structures Type 1 and Type 2, according to an embodiment.
Figure 21:
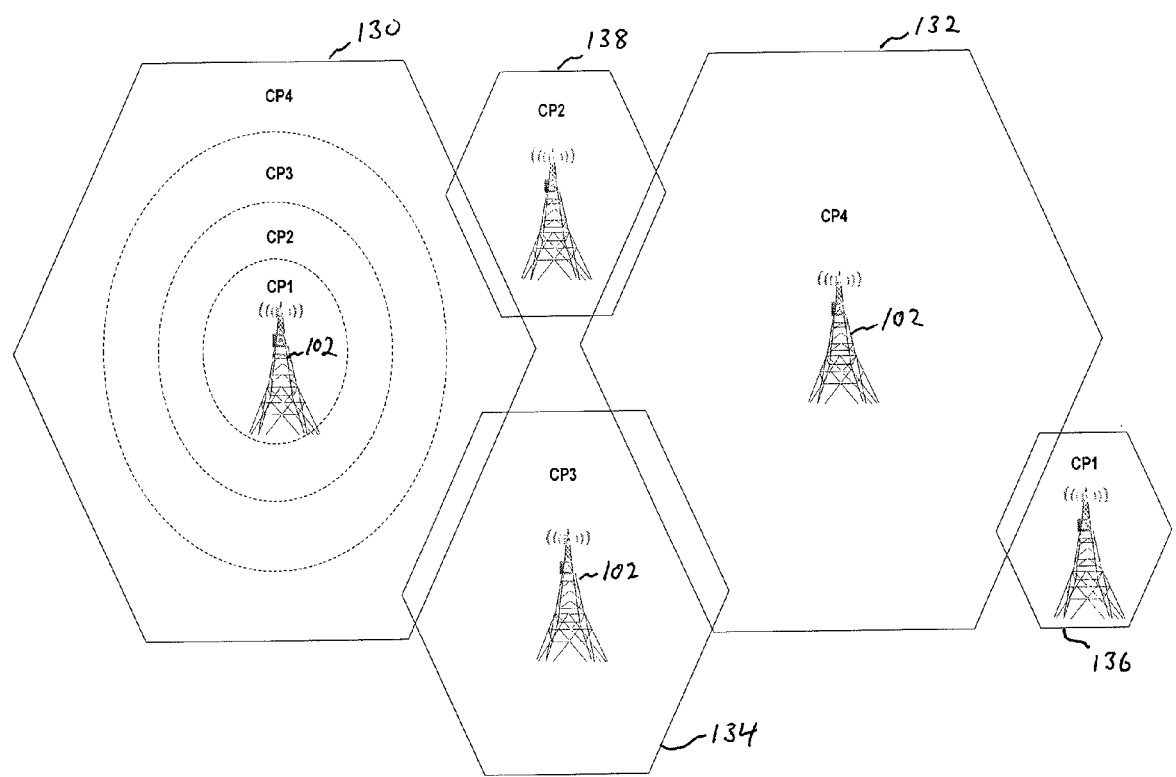
FIG. 21 illustrates a multi-CP network deployment for frame structure Type 3, according to an embodiment.

As illustrated in FIG. 20 and FIG. 21, multiple cyclic prefix lengths can be configured within the same network deployment, different base stations 102 can be configured to different cyclic prefix lengths for Frame Structure Type 1, 2, 3, and 4. Furthermore for Frame Structure Type 1, 2, and 3, different cyclic prefix lengths can be chosen within the same base station 102 cell for different subframes. The proposed implementation can also be adopted for LTE.

By adopting the proposed solutions described herein, the IEEE 8016m design become much cleaner and simpler with noticeable improved performance. All the following problems or challenges can be resolved nicely by the proposed solutions, which only require minimum changes in the current baseline design today.

While various embodiments of the invention have been described above, it should be understood that they have been presented by way of example only, and not by way of limitation Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for signal transmission in an Orthogonal Frequency Division Multiple Access (OFDMA) system, comprising:
   fixing a subcarrier spacing to a predetermined value for a plurality of subframes in a plurality of different bandwidths, wherein the predetermined value divides evenly at least one channel raster; and
   transmitting wirelessly an electromagnetic signal having the fixed subcarrier spacing and no guard band between adjacent carriers, regardless of a frame structure of the one or more subframes.

2. The method of claim 1, wherein a common value for the channel raster includes at least one of 100 kHz, 200 kHz, 250 kHz and 300 kHz.

3. The method of claim 1, wherein the predetermined value is 12.5 KHz.

4. The method of claim 1, wherein the predetermined value is 6.25 KHz for one or more low mobility mobile stations.

5. The method of claim 1, wherein the predetermined value is 25 KHz for one or more high mobility mobile stations.

6. The method of claim 1, wherein the frame structure is a Long Term Evolution (LTE)-Advanced frame structure.

7. The method of claim 6, wherein the frame structure is a frequency division duplex (FDD) frame structure.

8. The method of claim 6, wherein the frame structure is a time division duplex (TDD) frame structure.

9. The method of claim 1, wherein the frame structure is an IEEE 802.16m frame structure.

10. The method of claim 9, wherein the frame structure is an FDD frame structure.

11. The method of claim 9, wherein the frame structure is a TDD frame structure.

12. The method of claim 1, wherein the signal transmission is an uplink transmission.

13. The method of claim 1, wherein the signal transmission is a downlink transmission.

14. The method of claim 1, further comprising:
   transmitting a subframe with a predetermined unit resource block size.

15. The method of claim 14, wherein the predetermined unit resource block size is 16 subcarriers by 6 symbols.

16. The method of claim 14, wherein the predetermined unit resource block size is 4 subcarriers by 6 symbols.

17. The method of claim 14, wherein the predetermined unit resource supports multiple antenna transmission technologies.

18. A station configured for signal transmission in an Orthogonal Frequency Division Multiple Access (OFDMA) system, comprising:
   a processor configured to fix a subcarrier spacing to a predetermined value for a plurality of subframes in a plurality of different bandwidths, wherein the predetermined value divides evenly at least one channel raster; and a transmitter configured to transmit a signal having the fixed subcarrier spacing and no guard band between adjacent carriers, regardless of a frame structure of the one or more subframes.

19. The station of claim 18, wherein a common value for the channel raster includes at least one of 100 kHz, 200 kHz, 250 kHz and 300 kHz.

20. The station of claim 18, wherein the predetermined value is 12.5 KHz.

21. The station of claim 18, wherein the predetermined value is 6.25 KHz for one or more low mobility mobile stations.

22. The station of claim 18, wherein the predetermined value is 25 KHz for one or more high mobility mobile stations.

23. The station of claim 18, wherein the frame structure is a Long Term Evolution (LTE)-Advanced frame structure.

24. The station of claim 23, wherein the frame structure is a time division duplex (TDD) frame structure.

25. The station of claim 18, wherein the frame structure is a frequency division duplex (FDD) frame structure.

26. The station of claim 18, wherein the frame structure is an IEEE 802.16m frame structure.

27. The station of claim 26, wherein the frame structure is an FDD frame structure.

28. The station of claim 26, wherein the frame structure is a TDD frame structure.

29. The station of claim 18, wherein the signal transmission is an uplink transmission.

30. The station of claim 18, wherein the signal transmission is a downlink transmission.

31. The station of claim 18, wherein: the transmitter is configured to transmit a subframe with a predetermined unit resource block size.

32. The station of claim 31, wherein the predetermined unit resource block size is 16 subcarriers by 6 symbols.

33. The station of claim 31, wherein the predetermined unit resource block size is 4 subcarriers by 6 symbols.

34. The station of claim 31, wherein the predetermined unit resource supports multiple antenna transmission technologies.

35. A non-transitory computer-readable medium storing executable instructions thereon for performing a method for signal transmission in an Orthogonal Frequency Division Multiple Access (OFDMA) system, the method comprising:

fixing a subcarrier spacing to a predetermined value for a plurality of subframes in a plurality of different bandwidths, wherein the predetermined value divides evenly at least one channel raster; and transmitting wirelessly a signal having the fixed subcarrier spacing an no guard band between adjacent carriers, regardless of a frame structure of the one or more subframes.

36. The non-transitory computer-readable medium of claim 35, wherein a common value for the channel raster includes at least one of 100 kHz, 200 kHz, 250 kHz and 300 kHz.

37. The non-transitory computer-readable medium of claim 35, wherein the predetermined value is 12.5 KHz.

38. The non-transitory computer-readable medium of claim 35, wherein the predetermined value is 6.25 KHz for one or more low mobility mobile stations.

39. The non-transitory computer-readable medium of claim 35, wherein the predetermined value is 25 KHz for one or more high mobility mobile stations.

40. The non-transitory computer-readable medium of claim 35, wherein the frame structure is a Long Term Evolution (LTE)-Advanced frame structure.

41. The non-transitory computer-readable medium of claim 40, wherein the frame structure is a frequency division duplex (FDD) frame structure.

42. The non-transitory computer-readable medium of claim 40, wherein the frame structure is a time division duplex (TDD) frame structure.

43. The non-transitory computer-readable medium of claim 35, wherein the frame structure is an IEEE 802.16m frame structure.

44. The non-transitory computer-readable medium of claim 43, wherein the frame structure is an FDD frame structure.

45. The non-transitory computer-readable medium of claim 43, wherein the frame structure is a TDD frame structure.

46. The non-transitory computer-readable claim 35, wherein the signal transmission is an uplink transmission.

47. The non-transitory computer-readable medium of claim 35, wherein the signal transmission is a downlink transmission.

* * * * *